United States Patent
Shimomura et al.

(10) Patent No.: US 6,400,498 B1
(45) Date of Patent: Jun. 4, 2002

(54) OPTICAL SIGNAL REPEATING AND AMPLIFYING DEVICE AND OPTICAL LEVEL ADJUSTING DEVICE

(75) Inventors: Hirofumi Shimomura; Naoya Henmi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/087,213

(22) Filed: May 29, 1998

(30) Foreign Application Priority Data

| May 29, 1997 | (JP) | 9-140518 |
| May 29, 1997 | (JP) | 9-140519 |
| May 19, 1998 | (JP) | 10-137234 |
| May 19, 1998 | (JP) | 10-137235 |

(51) Int. Cl.$^7$ ................................. H01S 3/00
(52) U.S. Cl. .................... 359/341.1; 359/337; 359/349
(58) Field of Search ........................ 359/341.1, 349, 359/124, 161, 337

(56) References Cited

U.S. PATENT DOCUMENTS

| 5,337,176 A | * | 8/1994 | Tiemeijer ................... 359/344 |
| 5,392,154 A | * | 2/1995 | Chang et al. ............... 359/341 |
| 5,914,795 A | * | 6/1999 | Jourdan et al. ............. 359/341 |
| 6,064,514 A | * | 5/2000 | Aoki et al. ................. 359/341 |
| 6,094,296 A | * | 7/2000 | Kosaka ....................... 359/341 |

FOREIGN PATENT DOCUMENTS

| JP | 58-223114 | 12/1983 |
| JP | 61-84611 | 4/1986 |
| JP | 61-284708 | 12/1986 |
| JP | 3-269522 | 12/1991 |
| JP | 4-101124 | 4/1992 |
| JP | 5-190945 | 7/1993 |
| JP | 5-264870 | 10/1993 |
| JP | 6-275870 | 9/1994 |
| JP | 7-226560 | 8/1995 |
| JP | 7-245436 | 9/1995 |
| JP | 7-326826 | 12/1995 |
| JP | 8-32554 | 2/1996 |
| JP | 8-125634 | 5/1996 |
| JP | 8-213681 | 8/1996 |
| JP | 9-36834 | 2/1997 |
| JP | 9-73107 | 3/1997 |

* cited by examiner

Primary Examiner—Mark Hellner
(74) Attorney, Agent, or Firm—Scully, Scott, Murphy & Presser

(57) ABSTRACT

Disclosed is an optical signal repeating and amplifying device which has: an optical amplifier which amplifies an optical signal to be input thereto and then outputs it; and an optical filter means through which only one wavelength light of the optical signal to be output from the optical amplifier is passed. Also disclosed is an optical level adjusting device which has: an optical demultiplexer which demultiplexes a wavelength-multiplexed optical signal into a plurality of wavelength lights; a plurality of optical attenuators which attenuate separately the demultiplexed plurality of wavelength lights to be output from the optical demultiplexer; and an optical multiplexer which multiplexes the attenuated wavelength lights to be output from the plurality of optical attenuators into a wavelength-multiplexed optical signal and output it.

13 Claims, 22 Drawing Sheets

Figure 1:
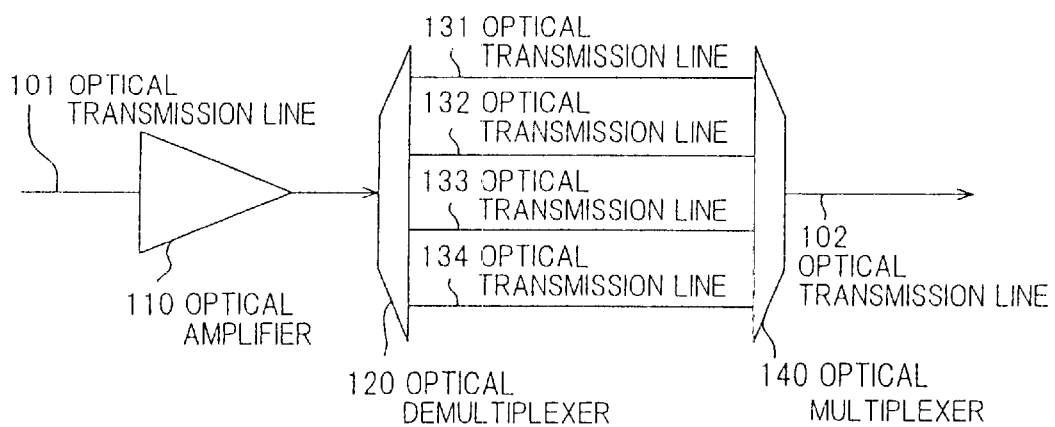

OPTICAL SIGNAL REPEATING AND AMPLIFYING DEVICE AND OPTICAL LEVEL ADJUSTING DEVICE

FIELD OF THE INVENTION

This invention relates to an optical signal repeating and amplifying device and an optical level adjusting device which are applied to the optical WDM transmission.

BACKGROUND OF THE INVENTION

The optical WDM transmission system that optical signals with different wavelengths are transmitted in the lump through one optical fiber allows a large-capacity optical transmission. In particular, owing to the development of high-gain and high-power optical amplifiers, such as an erbium-doped optical fiber amplifier, a long-distance and large-capacity optical transmission can be realized. In repeating optical signals in the optical transmission, to amplify the optical signals unalteredly without converting into electrical signals can contribute effectively to the miniaturization of repeating station, thereby reducing the cost of transmission. At present, to realize a further long-distance optical transmission by using a multiple-stage optical repeating and amplifying has been expected.

However, conventional optical signal repeating and amplifying device and optical level adjusting device have some problems described below.

First, due to the limitation on output power of optical amplifier, the optical power per one wave is limited when the number of optical signals multiplexed is increased. Thereby the transmission distance is also limited to be short.

Second, with an increase in the number of repeating amplifiers, the difference in optical level between wavelengths due to the gain deviation of optical amplifier is increased and an ASE noise generated from optical amplifier is also increased. Thereby the reception sensitivity must be reduced. Further, in connecting multiple-stage optical amplifiers, the optical level may be greatly different between wavelengths because optical amplifiers have different gains depending on wavelength.

SUMMARY OF THE INVENTION

Accordingly, it is an object of the invention to provide an optical signal repeating and amplifying device that the reception sensitivity can be enhanced by removing an ASE noise, the total optical intensity of optical signals to be output after wavelength-multiplexing can be increased, and the level of wavelength lights in WDM optical signal can be equalized.

It is a further object of the invention to provide an optical level adjusting device that the optical level of each wavelength can be adjusted into an arbitrary value.

According to the invention, an optical signal repeating and amplifying device, comprises:

an optical amplifier which amplifies an optical signal to be input thereto and then outputs it; and an optical filter means through which only one wavelength light of the optical signal to be output from the optical amplifier is passed.

According to another aspect of the invention, an optical signal repeating and amplifying device, comprises:

a first optical demultiplexer-multiplexer which demultiplexes a wavelength-multiplexed optical signal into a plurality of wavelength lights;

a plurality of optical transmission lines through which the plurality of wavelength lights from the first optical demultiplexer-multiplexer are separately transmitted; and a second optical demultiplexer-multiplexer which multiplexes the optical signals transmitted through the plurality of optical transmission lines into a wavelength-multiplexed optical signal and outputs it.

According to another aspect of the invention, an optical signal repeating and amplifying device, comprises:

an optical circulator through which a wavelength-multiplexed optical signal to be input to the input port is output from the input-output port and a wavelength-multiplexed optical signal to be input to the input-output port is output from the output port;

an optical demultiplexer-multiplexer which demultiplexes the wavelength-multiplexed optical signal from the optical circulator into a plurality of wavelength lights and multiplexes a plurality of wavelength lights into a wavelength-multiplexed optical signal;

a plurality of optical transmission lines through which the demultiplexed plurality of wavelength lights to be output from the optical demultiplexer-multiplexer are separately transmitted; and a plurality of optical reflecting mirrors which reflect separately the demultiplexed plurality of wavelength lights transmitted through the plurality of optical transmission lines to turn them back.

According to another aspect of the invention, an optical signal repeating and amplifying device, comprises:

an optical demultiplexer-multiplexer which demultiplexes a wavelength-multiplexed optical signal into a plurality of wavelength lights and multiplexes a plurality of wavelength lights into a wavelength-multiplexed optical signal;

a plurality of optical transmission lines through which the demultiplexed plurality of wavelength lights to be output from the optical demultiplexer-multiplexer are separately transmitted; and an optical dividing and coupling means through which each of the plurality of wavelength lights transmitted through each of the plurality of optical transmission lines is re-input to the optical demultiplexer-multiplexer while by-passing a different one of the optical transmission lines without overlapping with another wavelength light.

According to another aspect of the invention, an optical signal repeating and amplifying device, comprises:

a first optical demultiplexer-multiplexer which demultiplexes a wavelength-multiplexed optical signal into a plurality of wavelength lights;

a plurality of optical filters through which the plurality of wavelength lights from the first optical demultiplexer-multiplexer are separately passed; and a second optical demultiplexer-multiplexer which multiplexes the optical signals passed through the plurality of optical filters into a wavelength-multiplexed optical signal and outputs it.

According to another aspect of the invention, an optical signal repeating and amplifying device, comprises:

an optical divider which divides a wavelength-multiplexed optical signal into a plurality of lights;

a plurality of optical filters through which the plurality of wavelength lights from the optical divider are separately passed; and an optical coupler which couples the optical signals passed through the plurality of optical filters into a wavelength-multiplexed optical signal and outputs it.

According to another aspect of the invention, an optical signal repeating and amplifying device, comprises:

an optical circulator through which a wavelength-multiplexed optical signal to be input to the input port is output from the input-output port and a wavelength-multiplexed optical signal to be input to the input-output port is output from the output port;

an optical demultiplexer-multiplexer which demultiplexes the wavelength-multiplexed optical signal from the optical circulator into a plurality of wavelength lights and multiplexes a plurality of wavelength lights into a wavelength-multiplexed optical signal;

a plurality of optical filters through which the demultiplexed plurality of wavelength lights to be output from the optical demultiplexer-multiplexer are separately passed; and a plurality of optical reflecting mirror which reflect separately the demultiplexed plurality of wavelength lights passed through the plurality of optical filters to turn them back.

According to another aspect of the invention, an optical signal repeating and amplifying device, comprises:

an optical circulator through which a wavelength-multiplexed optical signal to be input to the input port is output from the input-output port and a wavelength-multiplexed optical signal to be input to the input-output port is output from the output port;

an optical divider-coupler which divides the wavelength-multiplexed optical signal from the optical circulator into a plurality of lights and couples a plurality of lights into a wavelength-multiplexed optical signal;

a plurality of optical filters through which the divided plurality of lights to be output from the optical divider-coupler are separately passed; and a plurality of optical reflecting mirrors which reflect separately the divided plurality of lights passed through the plurality of optical filters to turn them back.

According to another aspect of the invention, an optical signal repeating and amplifying device, comprises:

an optical divider-coupler which divides the wavelength-multiplexed optical signal from the optical circulator into a plurality of lights and couples a plurality of lights into a wavelength-multiplexed optical signal;

a plurality of optical transmission lines which the divided plurality of lights to be output from the optical divider-coupler are separately transmitted;

a plurality of optical filters through which the divided plurality of lights from the plurality of optical transmission lines are separately passed; and an optical dividing and coupling means through which each of the plurality of lights passed through each of the plurality of optical filters is re-input to the optical divider-coupler while by-passing a different one of the optical transmission lines without overlapping with another light.

According to another aspect of the invention, an optical level adjusting device, comprises:

an optical demultiplexer which demultiplexes a wavelength-multiplexed optical signal into a plurality of wavelength lights;

a plurality of optical attenuators which attenuate separately the demultiplexed plurality of wavelength lights to be output from the optical demultiplexer; and an optical multiplexer which multiplexes the attenuated wavelength lights to be output from the plurality of optical attenuators into a wavelength-multiplexed optical signal and output it.

According to another aspect of the invention, an optical level adjusting device, comprises:

an optical circulator through which a wavelength-multiplexed optical signal to be input to the input port is output from the input-output port and a wavelength-multiplexed optical signal to be input to the input-output port is output from the output port;

an optical demultiplexer-multiplexer which demultiplexes the wavelength-multiplexed optical signal from the optical circulator into a plurality of wavelength lights and multiplexes a plurality of wavelength lights into a wavelength-multiplexed optical signal;

a plurality of optical attenuators which attenuate separately the demultiplexed plurality of wavelength lights to be output from the optical demultiplexer-multiplexer; and a plurality of optical reflecting mirrors which reflect separately the attenuated plurality of wavelength lights passed through the plurality of optical attenuators to turn them back through the plurality of optical attenuators to the optical demultiplexer-multiplexer.

According to another aspect of the invention, an optical level adjusting device, comprises:

an optical demultiplexer-multiplexer which demultiplexes a wavelength-multiplexed optical signal into a plurality of wavelength lights and multiplexes a plurality of wavelength lights into a wavelength-multiplexed optical signal;

a plurality of optical transmission lines through which the demultiplexed plurality of wavelength lights to be output from the optical demultiplexer-multiplexer are separately transmitted;

an optical dividing and coupling means through which each of the plurality of wavelength lights transmitted through each of the plurality of optical transmission lines is re-input to the optical demultiplexer-multiplexer while by-passing a different one of the optical transmission lines without overlapping with another wavelength light; and a plurality of optical attenuators which are disposed between any two of the optical transmission lines to attenuate separately the demultiplexed plurality of wavelength lights to be transmitted therebetween.

According to another aspect of the invention, an optical signal repeating and amplifying device, comprises:

a first optical demultiplexer-multiplexer which demultiplexes a wavelength-multiplexed optical signal to be input thereto into a plurality of different wavelength lights;

a plurality of optical amplifiers which amplify separately the demultiplexed plurality of different wavelength lights; and a second optical demultiplexer-multiplexer which multiplexes the amplified wavelength lights to be output from the plurality of optical amplifiers into a wavelength-multiplexed optical signal.

According to another aspect of the invention, an optical signal repeating and amplifying device, comprises:

an optical circulator through which a wavelength-multiplexed optical signal to be input to the input port is output from the input-output port and a wavelength-multiplexed optical signal to be input to the input-output port is output from the output port;

an optical demultiplexer-multiplexer which demultiplexes the wavelength-multiplexed optical signal from the optical circulator into a plurality of wavelength lights and multiplexes a plurality of wavelength lights into a wavelength-multiplexed optical signal;

a plurality of optical amplifiers which amplify separately the demultiplexed plurality of different wavelength lights to be output from the optical demultiplexer-multiplexer; and a plurality of optical reflecting mirrors which reflect separately the plurality of wavelength lights to be output from the plurality of optical amplifiers to turn them back through the plurality of optical amplifiers to the optical demultiplexer-multiplexer.

According to another aspect of the invention, an optical signal repeating and amplifying device, comprises:

an optical demultiplexer-multiplexer which demultiplexes the wavelength-multiplexed optical signal to be input thereto into a plurality of wavelength lights and multiplexes a plurality of wavelength lights into a wavelength-multiplexed optical signal;

a plurality of first optical transmission lines which are connected with the input-output ports on the demultiplex side of the optical demultiplexer-multiplexer;

a plurality of optical divider-couplers which are connected to the ends of the plurality of first optical transmission lines;

a plurality of second optical transmission lines which connect between different two of the plurality of optical divider-couplers, the connecting not to be in parallel to another connecting; and a plurality of bi-directional optical amplifiers which are inserted into the plurality of second optical transmission lines and amplify an optical signal to transmit therethrough.

According to another aspect of the invention, an optical level adjusting device, comprises:

a first optical demultiplexer-multiplexer which demultiplexes a wavelength-multiplexed optical signal to be input thereto into a plurality of different wavelength lights;

a plurality of optical amplifiers which amplify separately the demultiplexed plurality of different wavelength lights; and a second optical demultiplexer-multiplexer which multiplexes the amplified wavelength lights to be output from the plurality of optical amplifiers into a wavelength-multiplexed optical signal; and means for controlling separately the gain of the plurality of optical amplifiers.

According to another aspect of the invention, an optical level adjusting device, comprises:

an optical circulator through which a wavelength-multiplexed optical signal to be input to the input port is output from the input-output port and a wavelength-multiplexed optical signal to be input to the input-output port is output from the output port;

an optical demultiplexer-multiplexer which demultiplexes the wavelength-multiplexed optical signal from the optical circulator into a plurality of wavelength lights and multiplexes a plurality of wavelength lights into a wavelength-multiplexed optical signal;

a plurality of bidirectional optical amplifiers which amplify separately the demultiplexed plurality of different wavelength lights to be output from the optical demultiplexer-multiplexer;

a plurality of optical reflecting mirrors which reflect separately the plurality of wavelength lights to be output from the plurality of optical amplifiers to turn them back through the so plurality of optical amplifiers to the optical demultiplexer-multiplexer;

means for controlling separately either the gain of the plurality of optical amplifiers or the reflectivity of the plurality of optical reflecting mirrors.

According to another aspect of the invention, an optical level adjusting device, comprises:

an optical demultiplexer-multiplexer which demultiplexes the wavelength-multiplexed optical signal to be input thereto into a plurality of wavelength lights and multiplexes a plurality of wavelength lights into a wavelength-multiplexed optical signal;

a plurality of first optical transmission lines which are connected with the input-output ports on the demultiplex side of the optical demultiplexer-multiplexer;

a plurality of optical divider-couplers which are connected to the ends of the plurality of first optical transmission lines;

a plurality of second optical transmission lines which connect between different two of the plurality of optical divider-couplers, the connecting not to be in parallel to another connecting;

a plurality of bi-directional optical amplifiers which are inserted into the plurality of second optical transmission lines and amplify an optical signal to transmit therethrough; and means for controlling separately the gain of the plurality of bi-directional optical amplifiers.

BRIEF DESCRIPTION OF THE INVENTION

Figure 2:
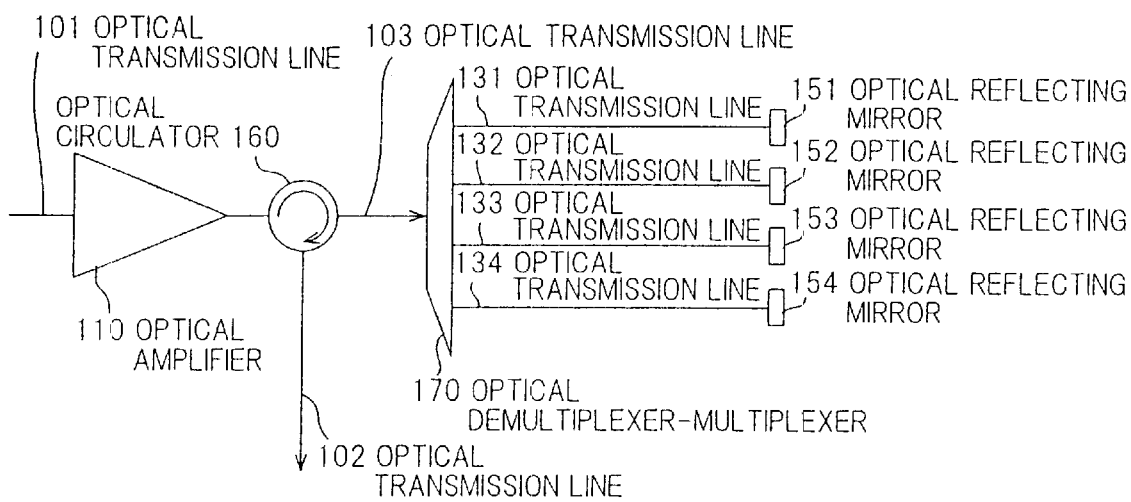
Figure 3:
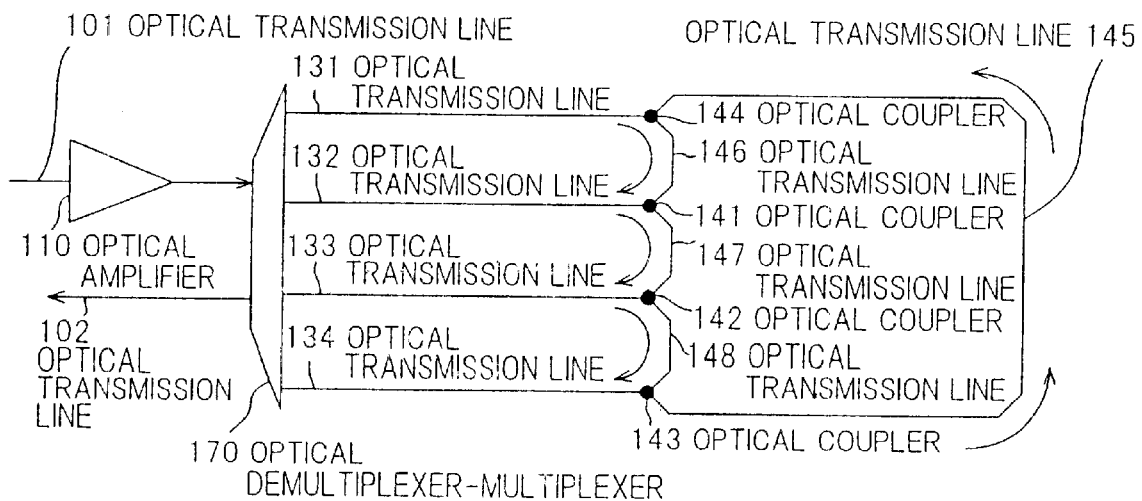
Figure 4:
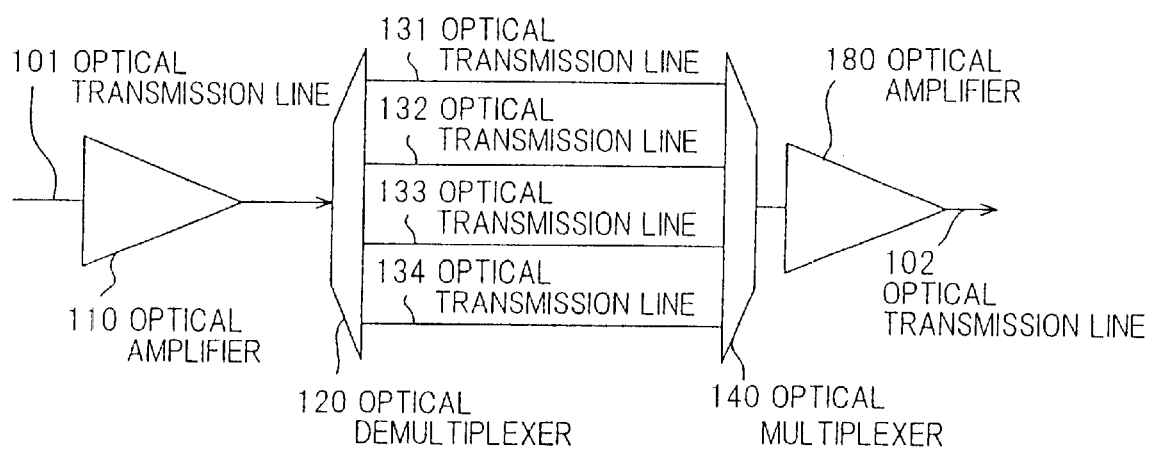
Figure 5:
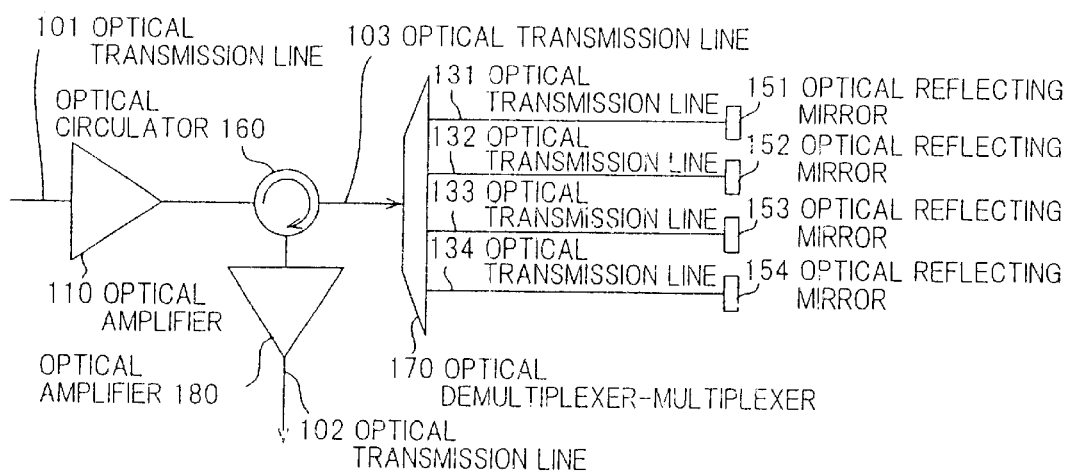
Figure 6:
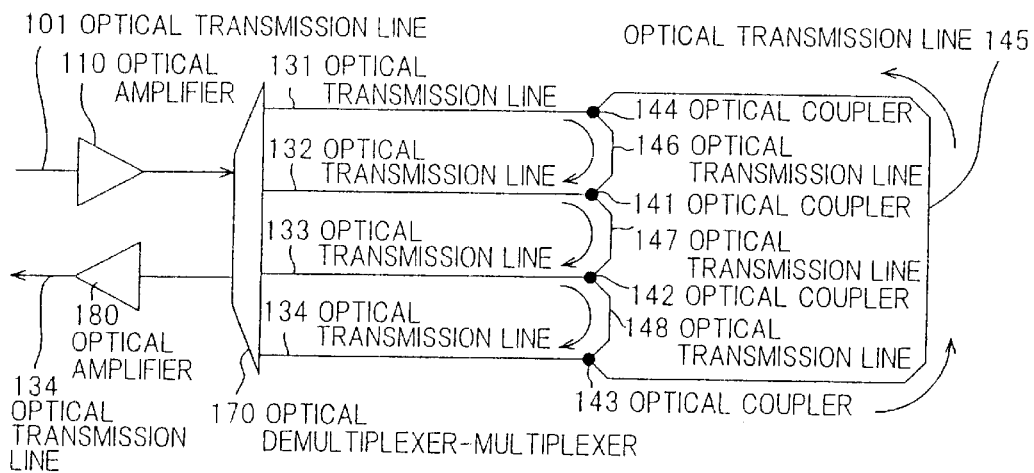
Figure 7:
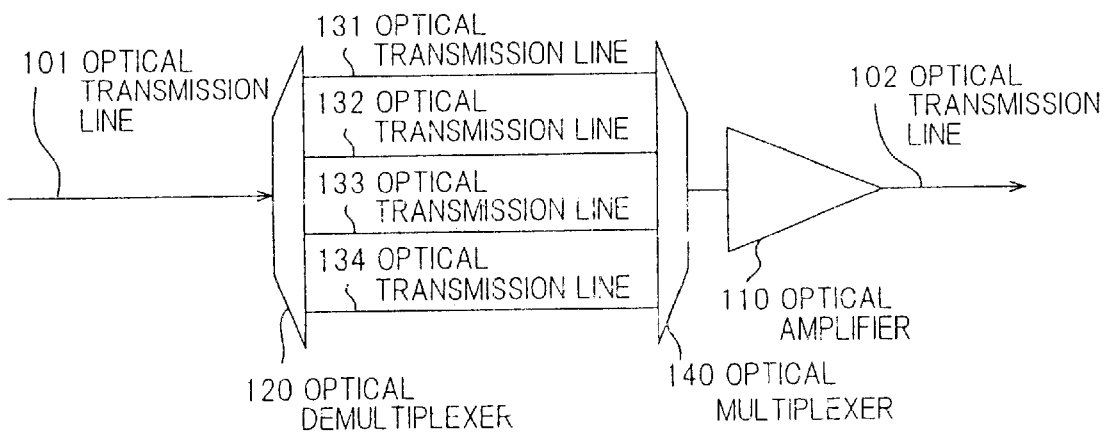
Figure 8:
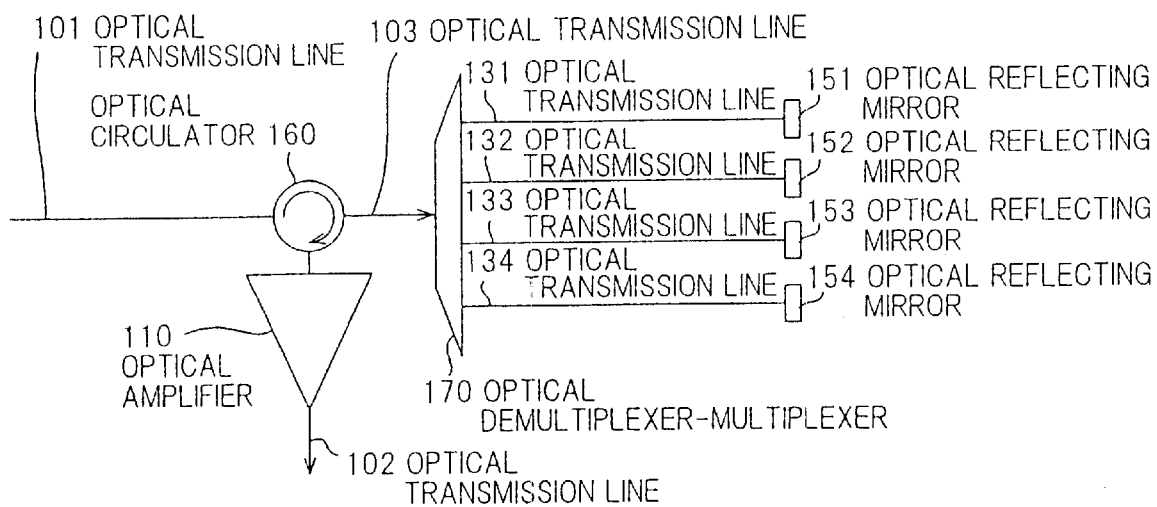
Figure 9:
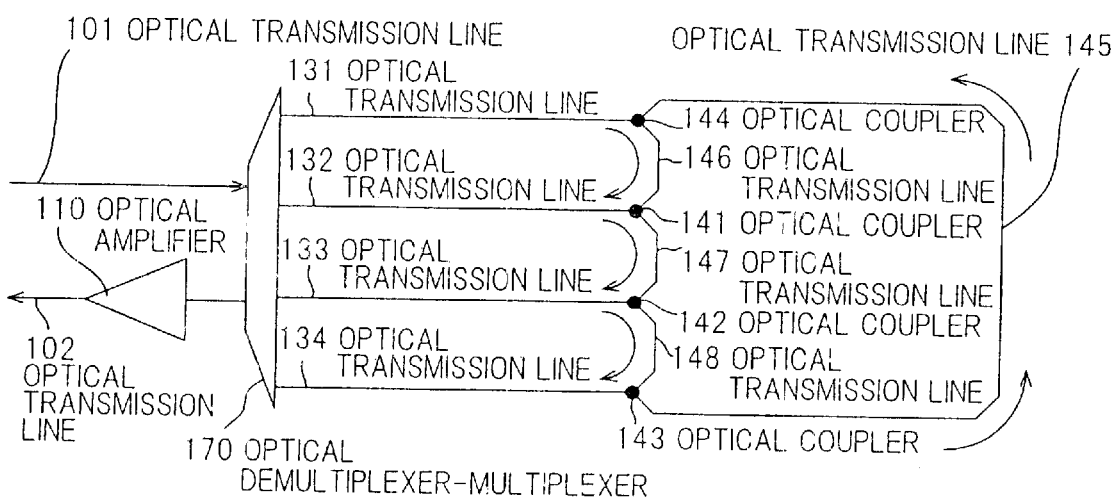
Figure 10:
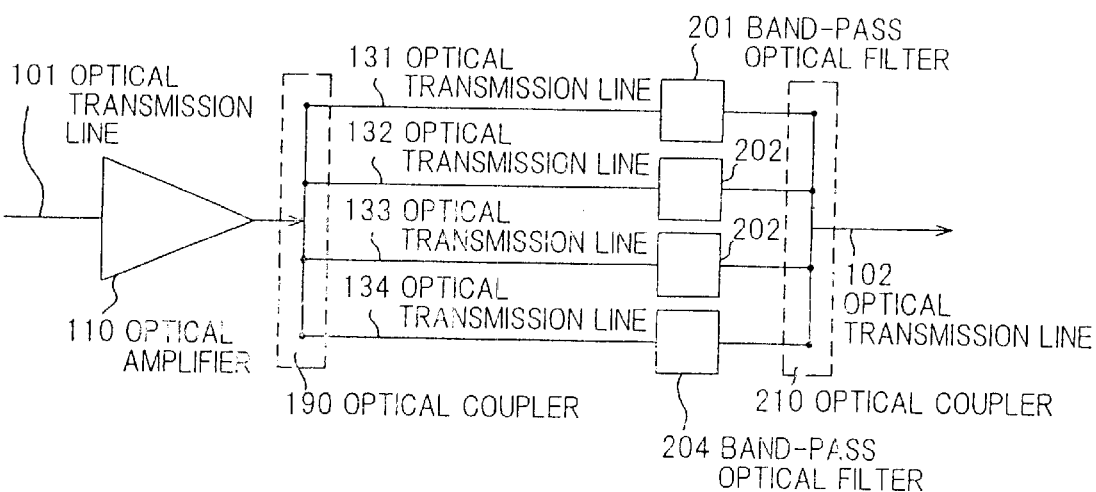
Figure 11:
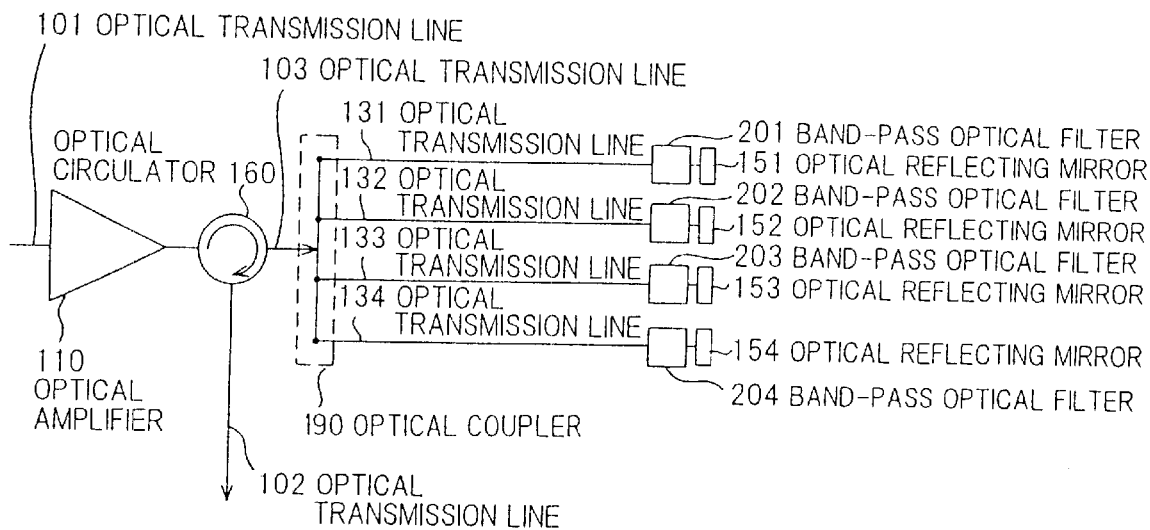
Figure 12:
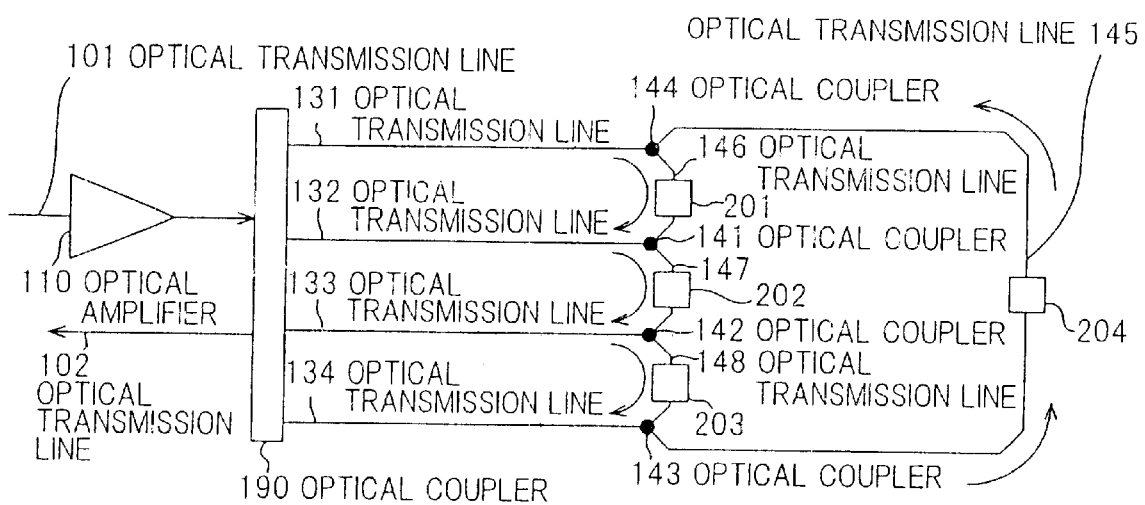
Figure 13:
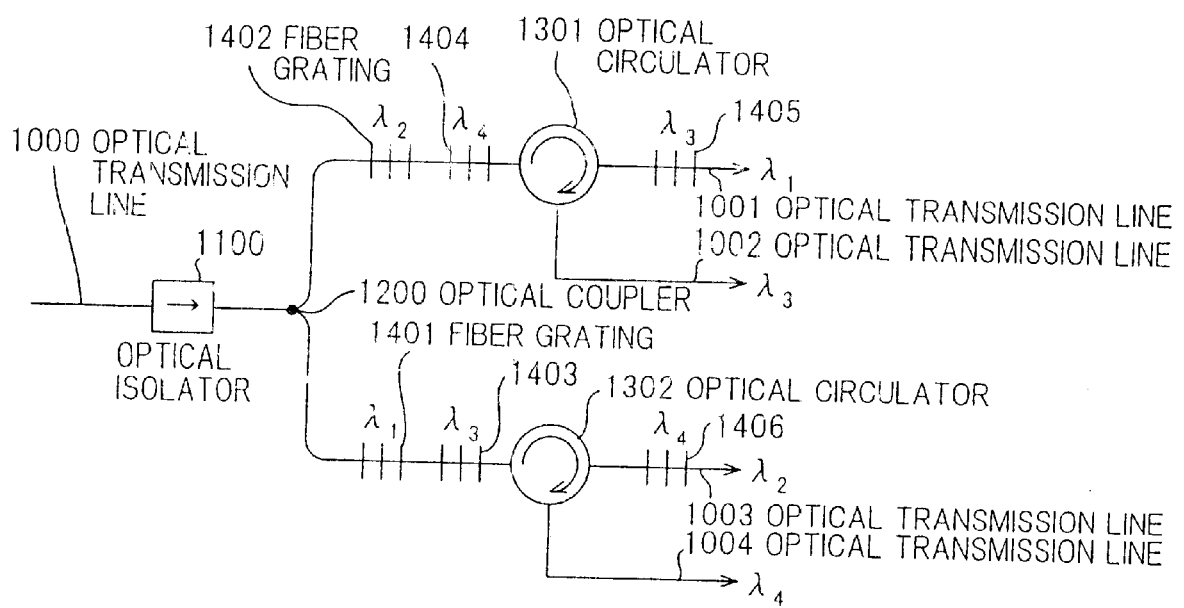
Figure 14:
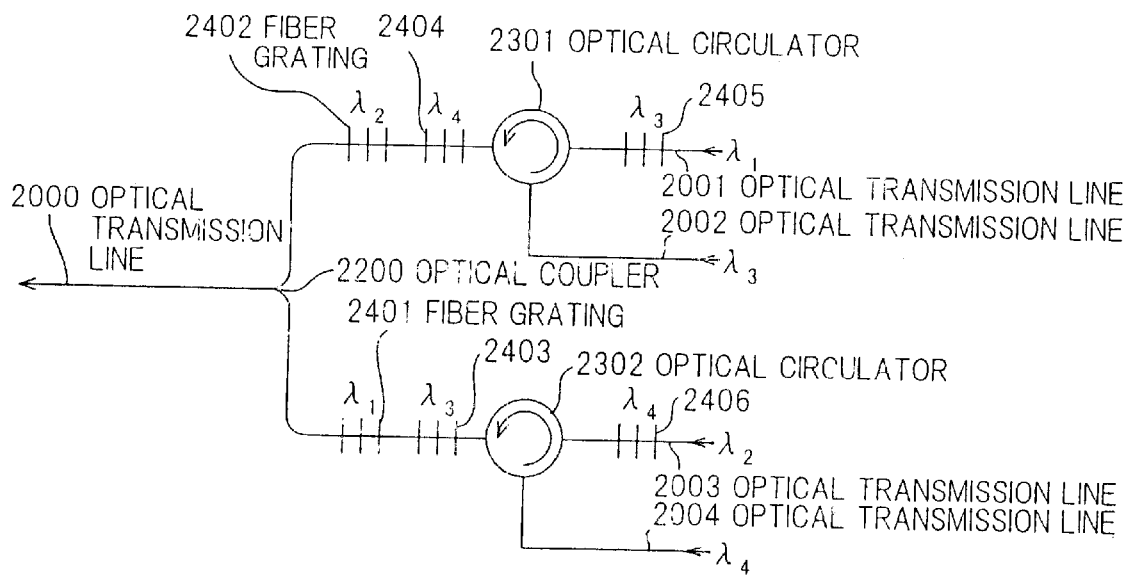
Figure 15:
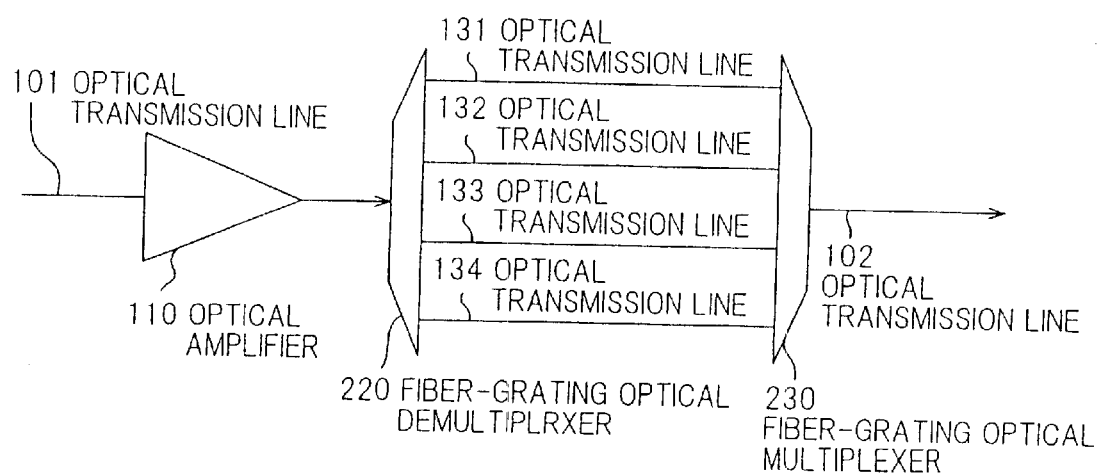
Figure 16:
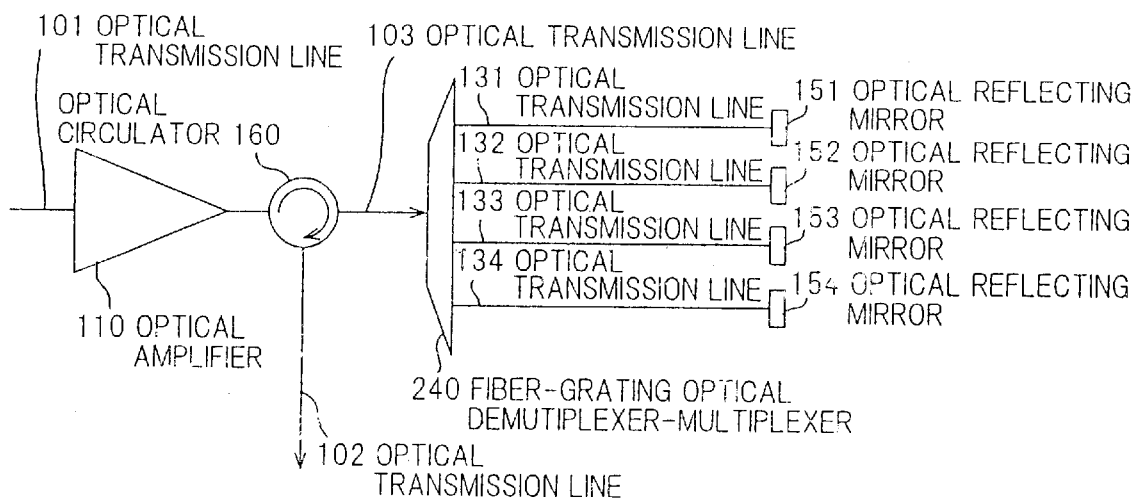
Figure 17:
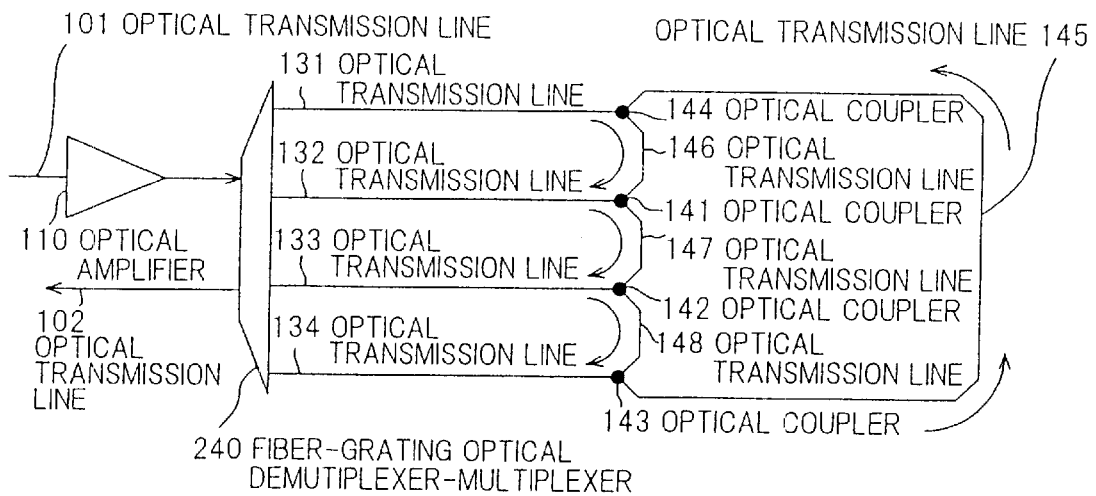
Figure 18:
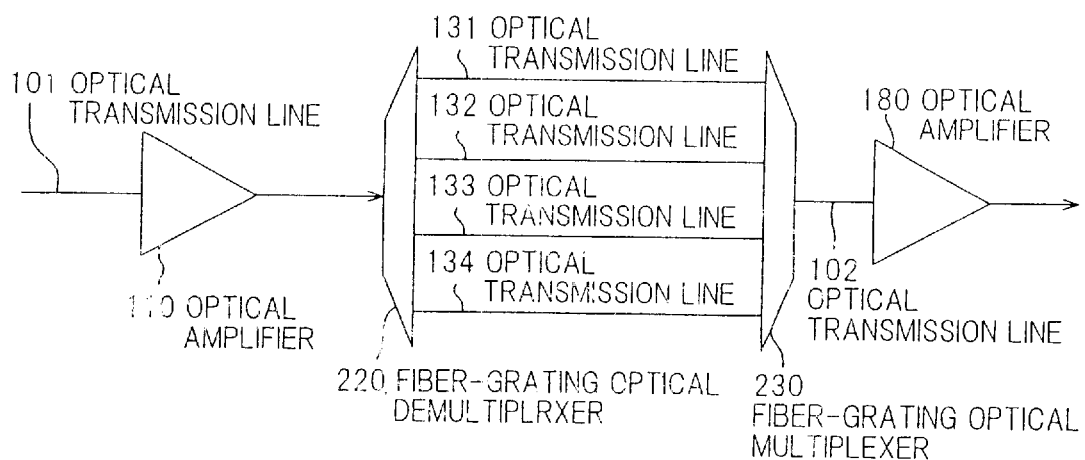
Figure 19:
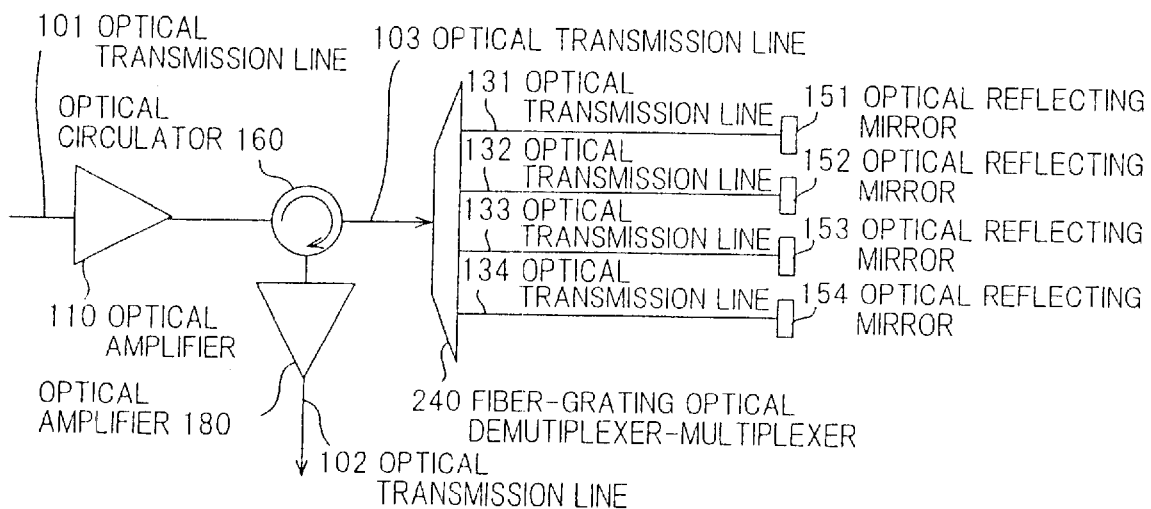
Figure 20:
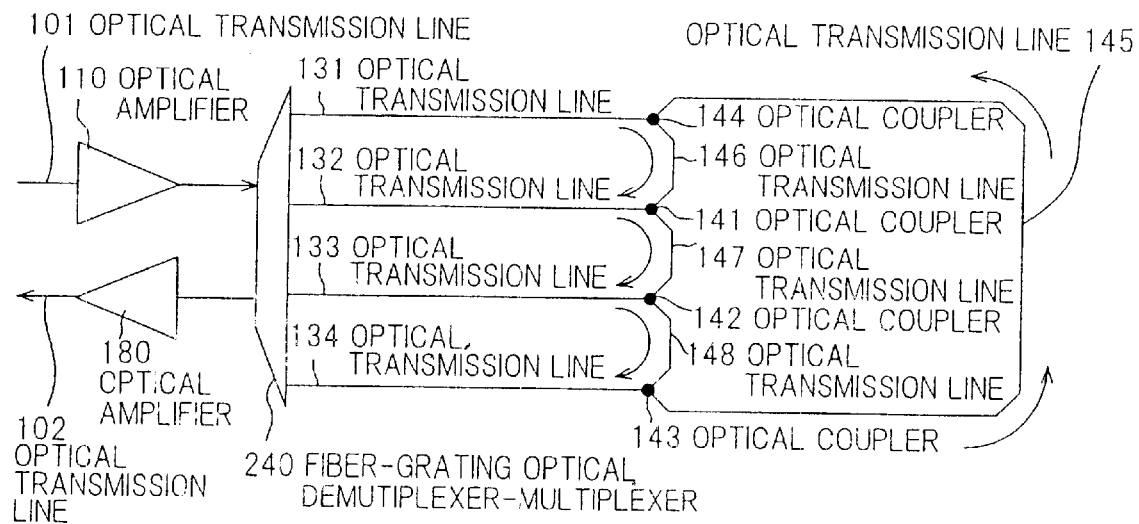
Figure 21:
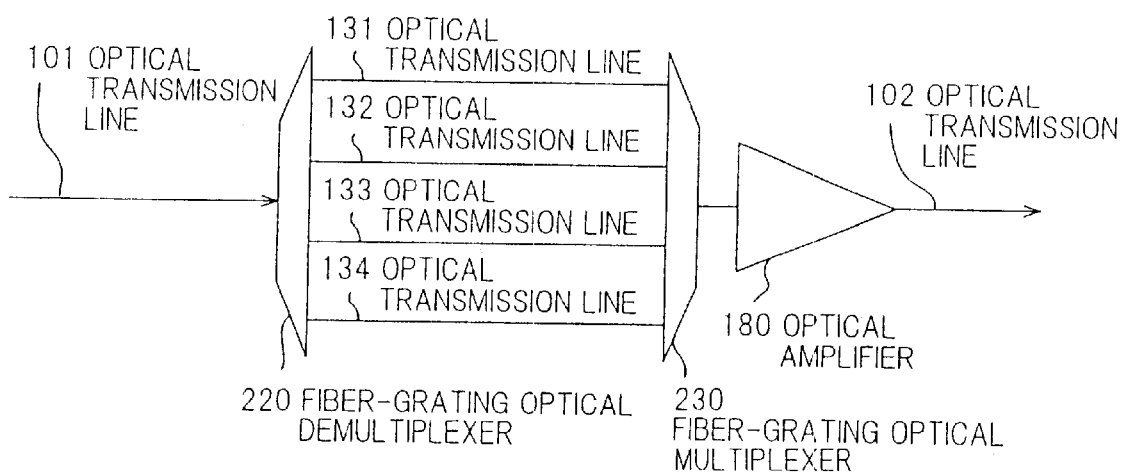
Figure 22:
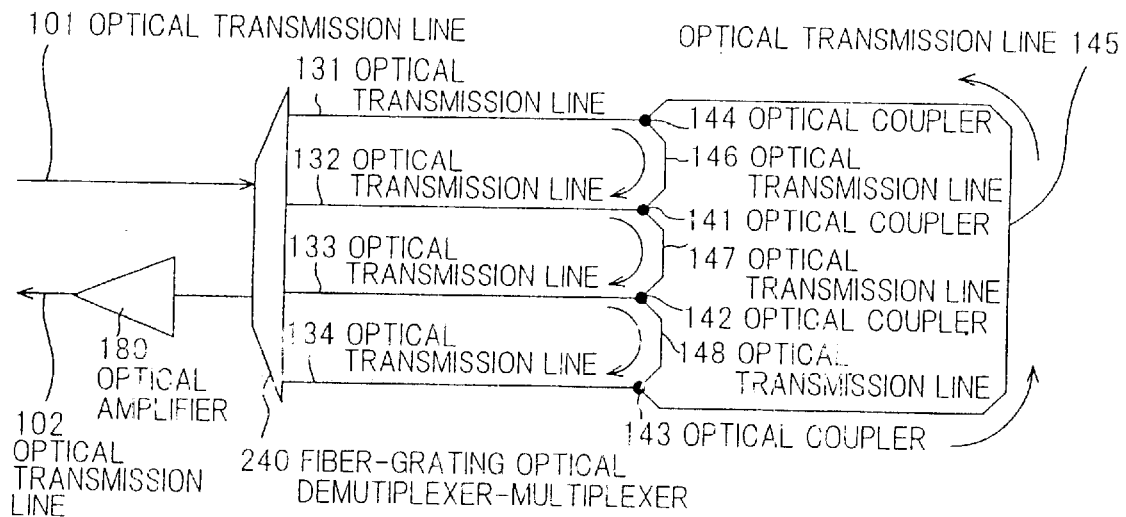
Figure 23:
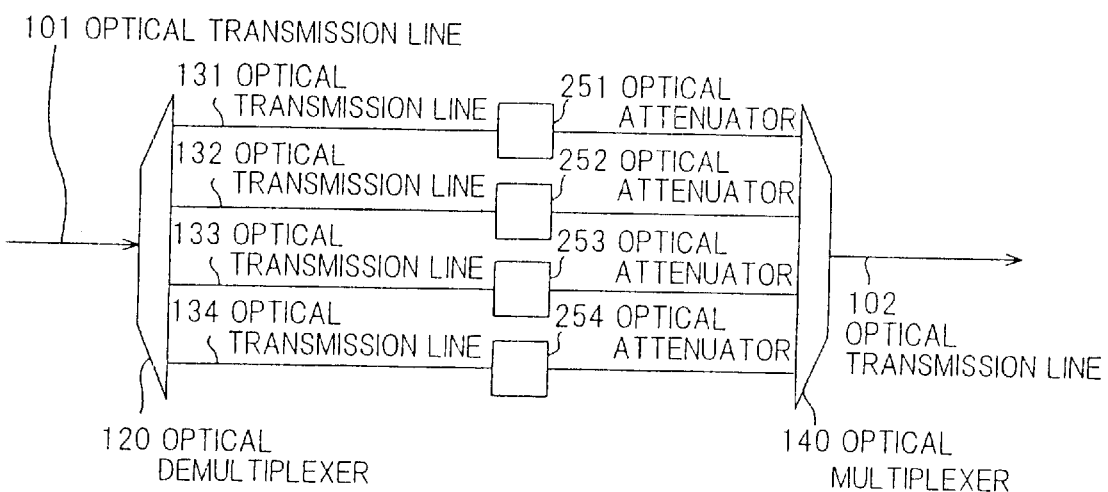
Figure 24:
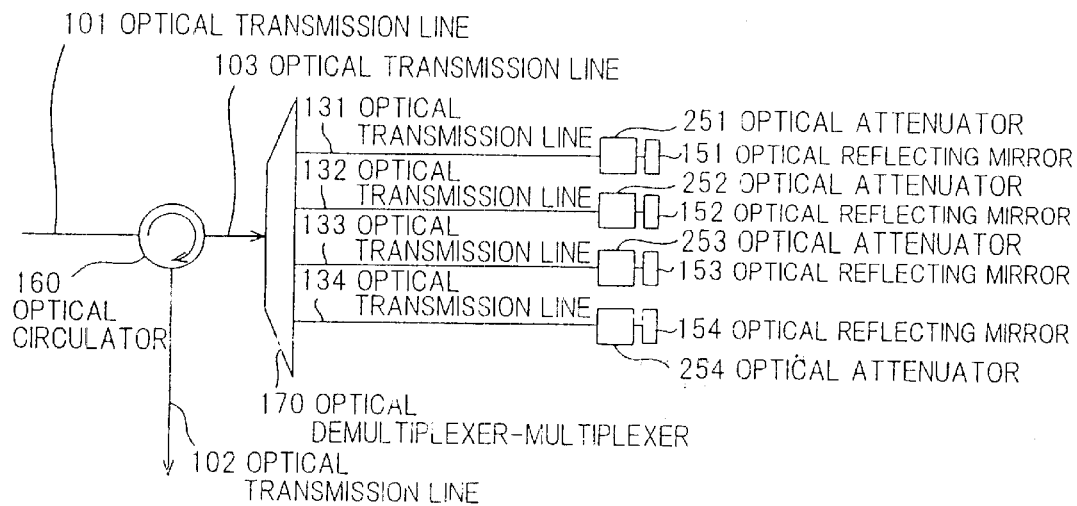
Figure 25:
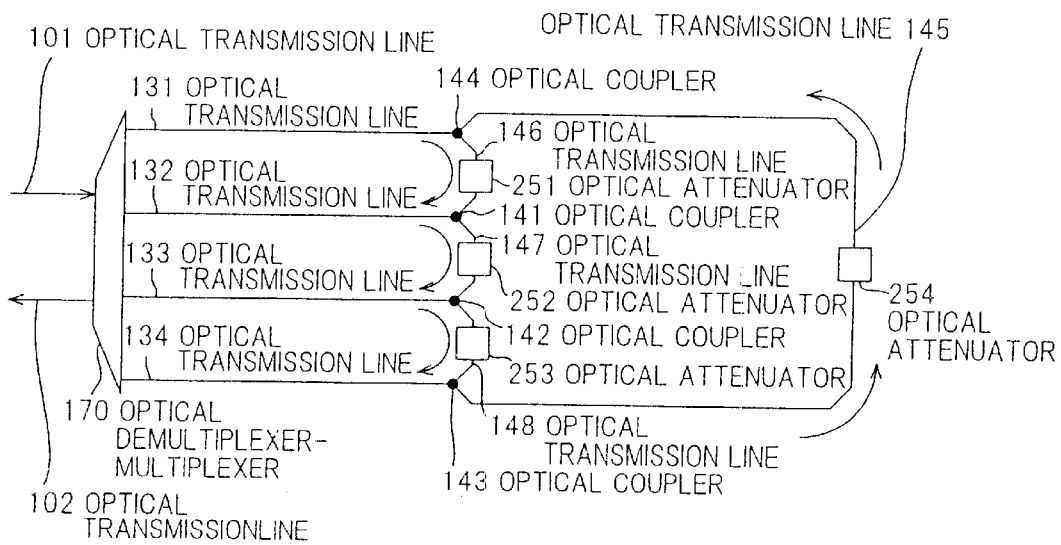
Figure 26:
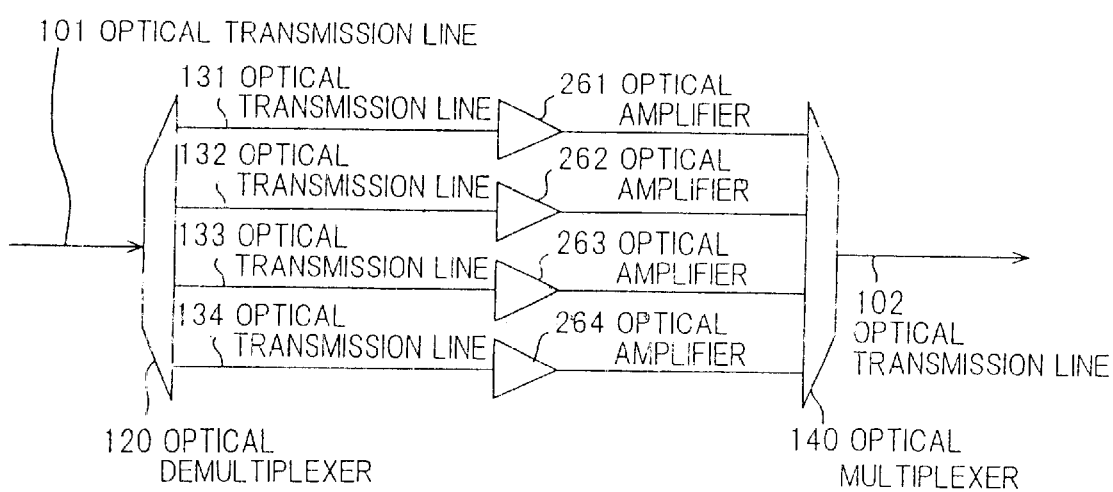
Figure 27:
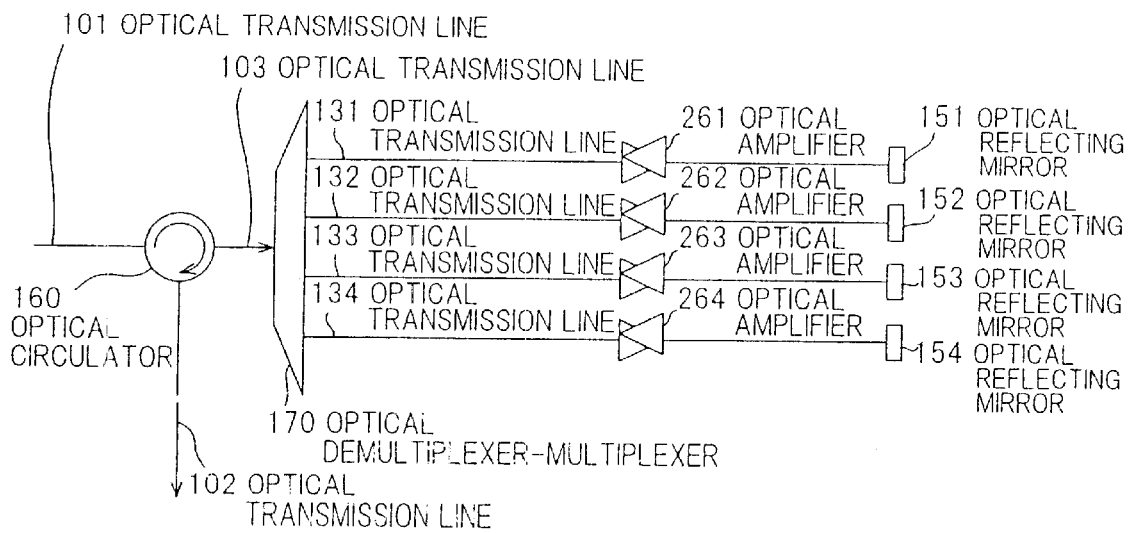
Figure 28:
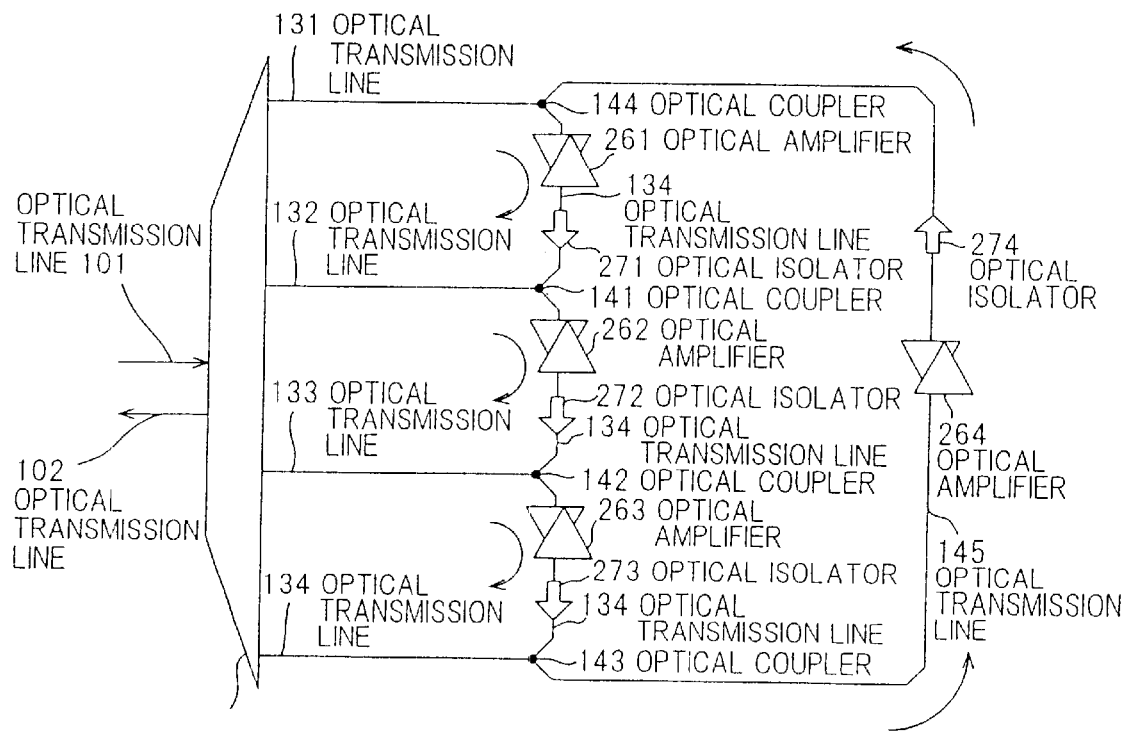
Figure 29:
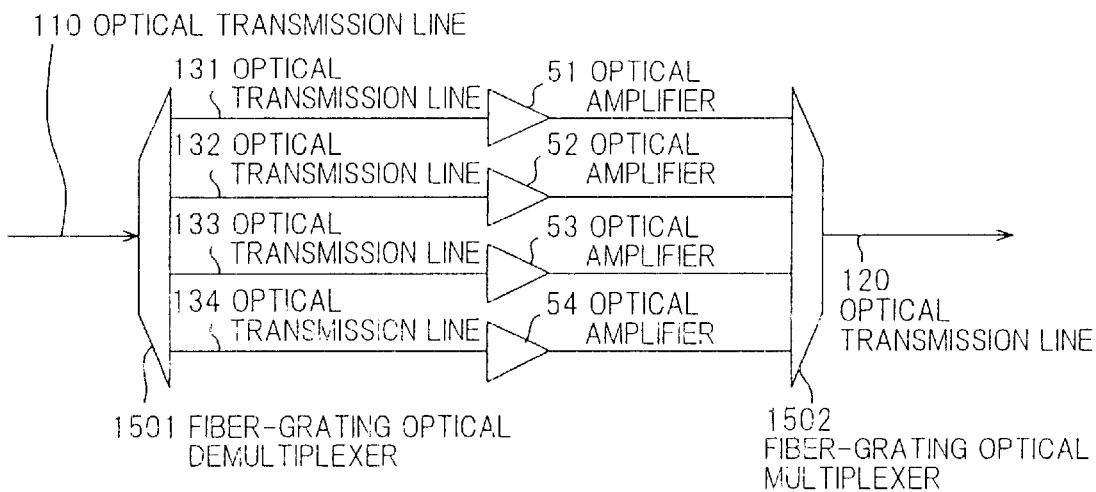
Figure 30:
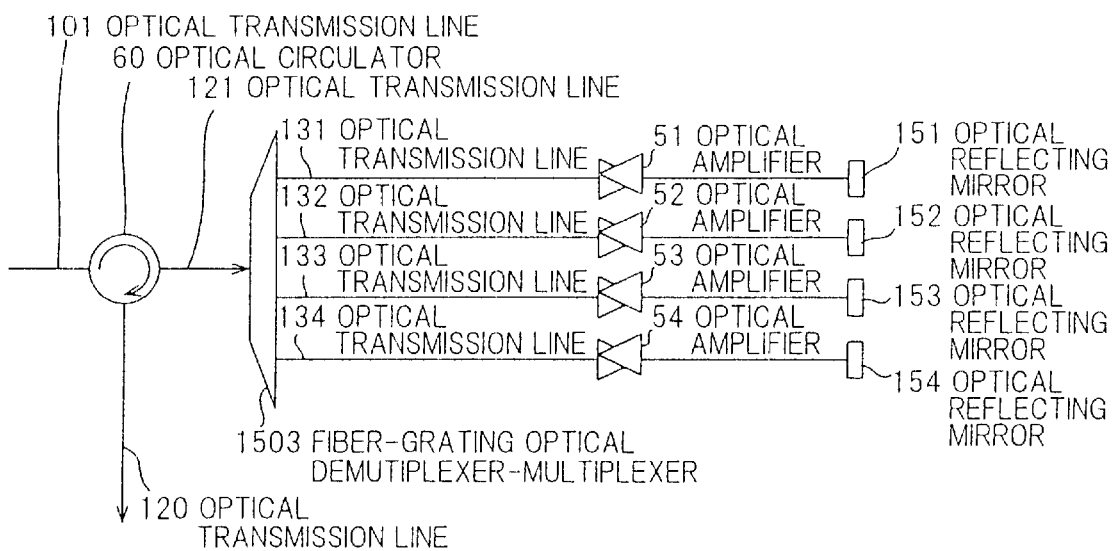
Figure 31:
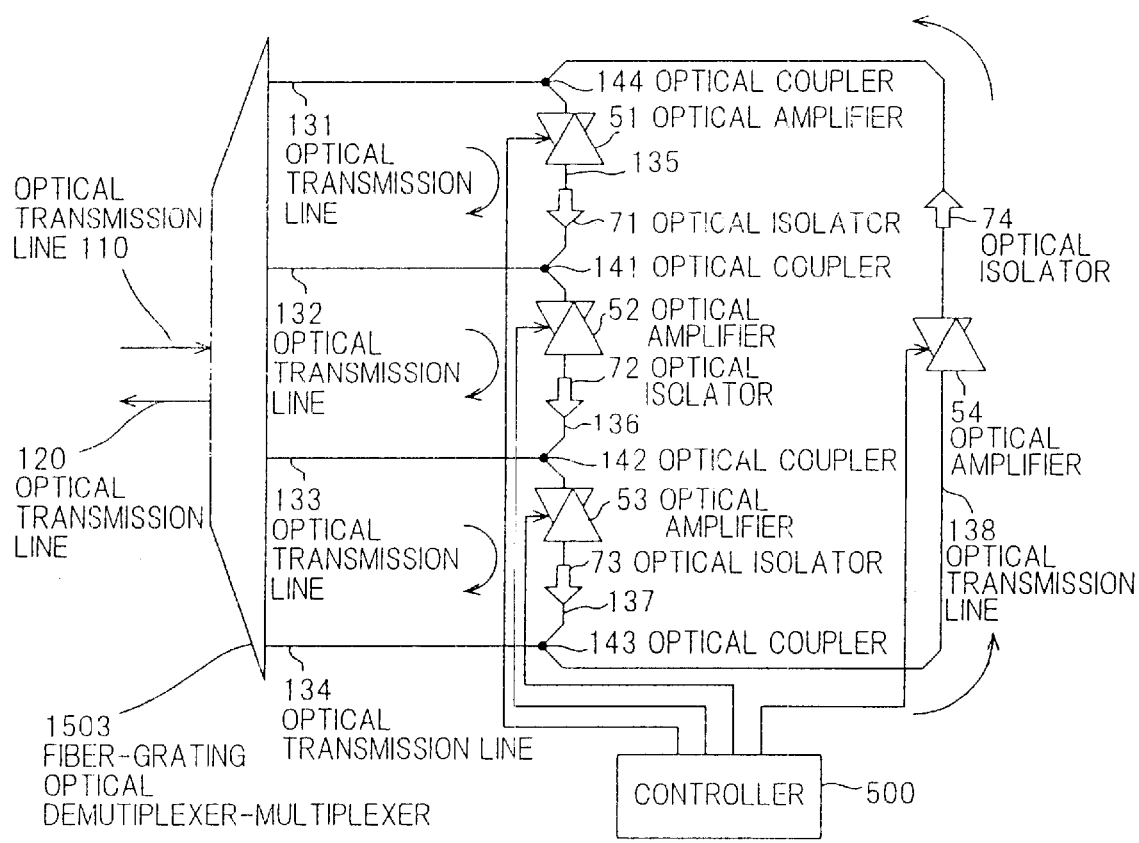
Figure 32:
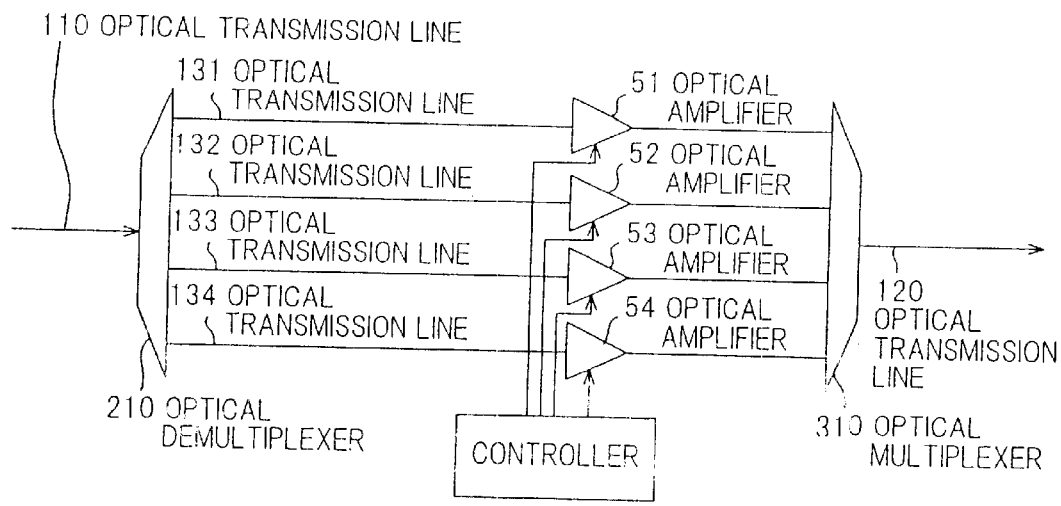
Figure 33:
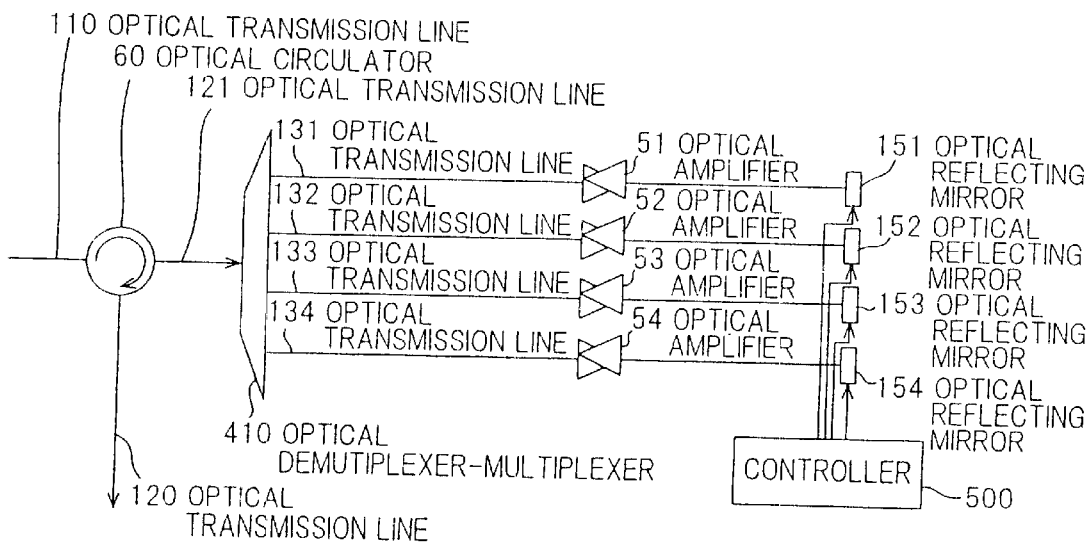
Figure 34:
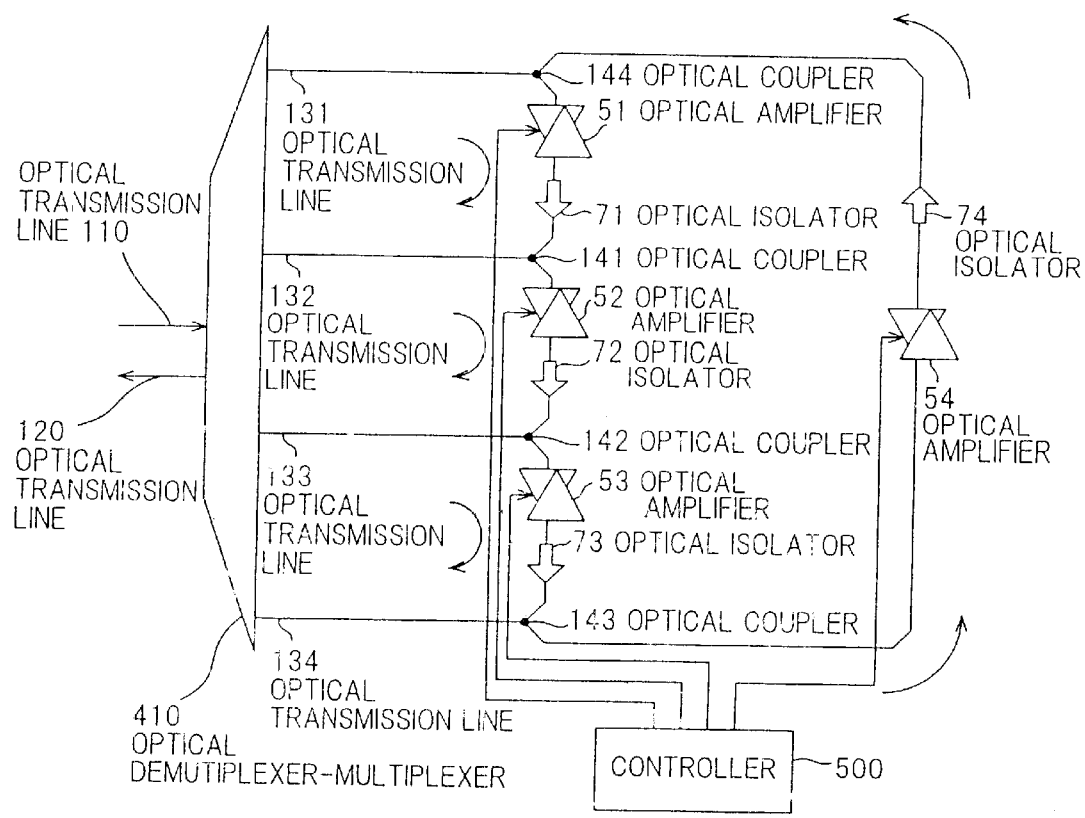
Figure 35:
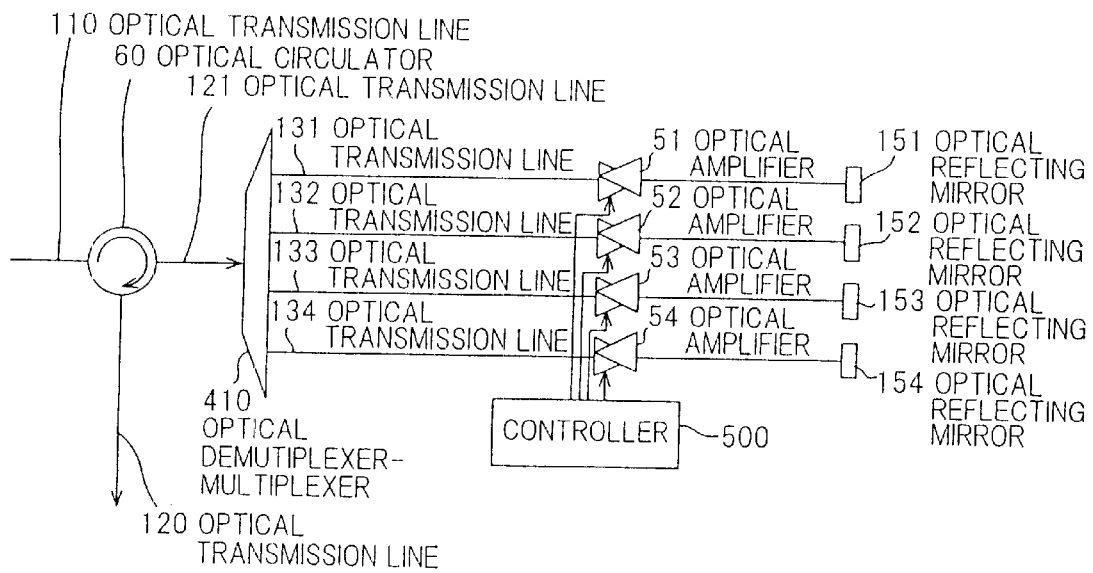
Figure 36:
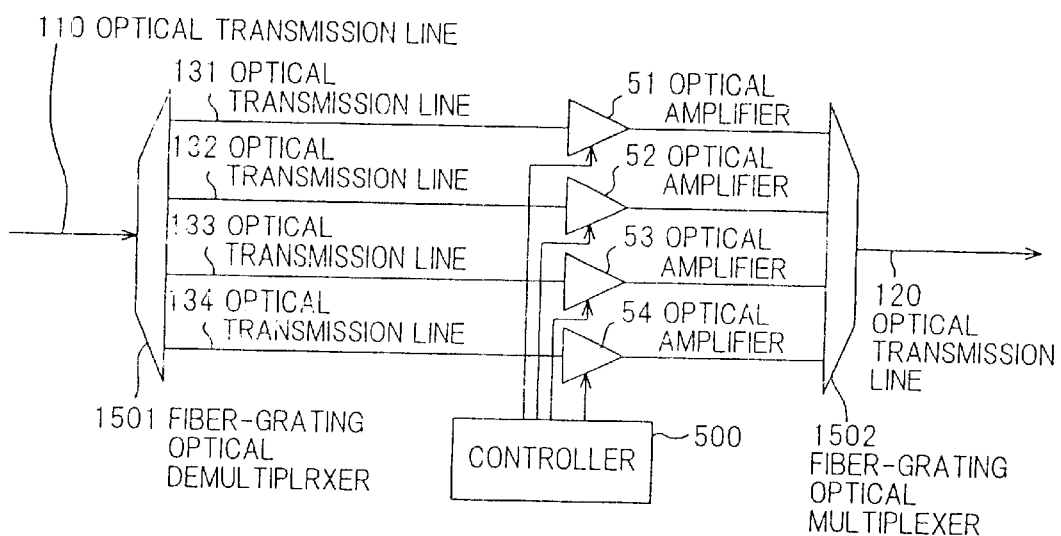
Figure 37:
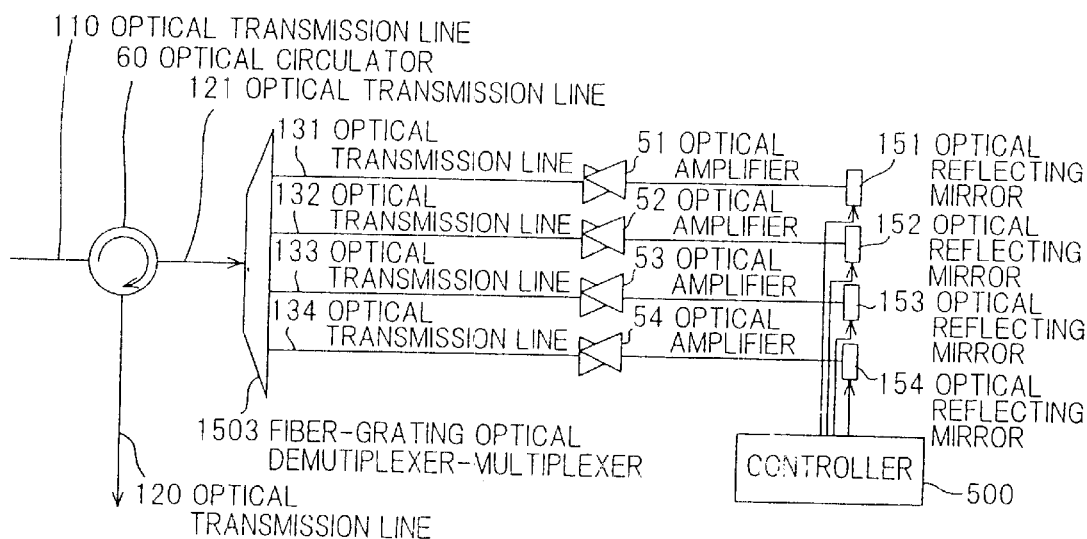
Figure 38:
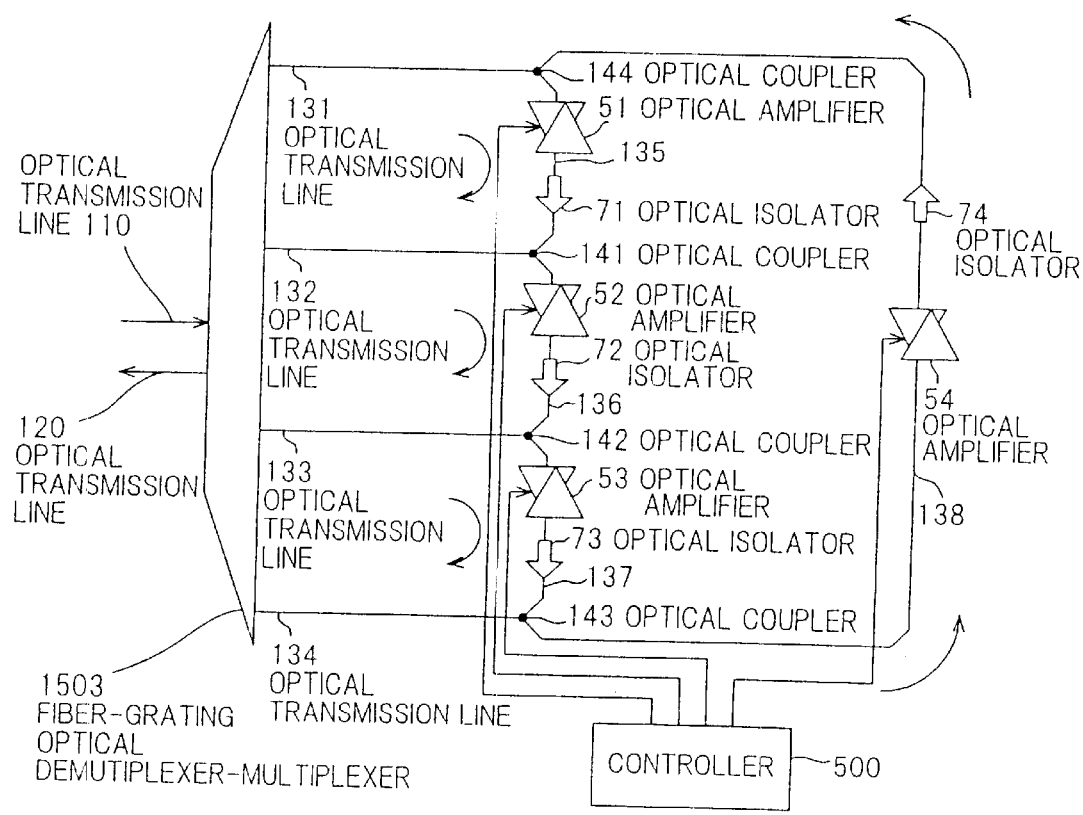

The invention will be explained in more detail in conjunction with the appended drawings, wherein:

FIG. 1 is a block diagram showing an optical signal repeating and amplifying device in a first preferred embodiment according to the invention, FIG. 2 is a block diagram showing an optical signal repeating and amplifying device in a second preferred embodiment according to the invention, FIG. 3 is a block diagram showing an optical signal repeating and amplifying device in a third preferred embodiment according to the invention, FIG. 4 is a block diagram showing an optical signal repeating and amplifying device in a fourth preferred embodiment according to the invention, FIG. 5 is a block diagram showing an optical signal repeating and amplifying device in a fifth preferred embodiment according to the invention, FIG. 6 is a block diagram showing an optical signal repeating and amplifying device in a sixth preferred embodiment according to the invention, FIG. 7 is a block diagram showing an optical signal repeating and amplifying device in a seventh preferred embodiment according to the invention, FIG. 8 is a block diagram showing an optical signal repeating and amplifying device in an eighth second preferred embodiment according to the invention, FIG. 9 is a block diagram showing an optical signal repeating and amplifying device in a ninth preferred embodiment according to the invention, FIG. 10 is a block diagram showing an optical signal repeating and amplifying device in a tenth preferred embodiment according to the invention, FIG. 11 is a block diagram showing an optical signal repeating and amplifying device in an eleventh preferred embodiment according to the invention, FIG. 12 is a block diagram showing an optical signal repeating and amplifying device in a twelfth preferred embodiment according to the invention, FIG. 13 is a block diagram showing an optical demultiplexer 120 used in the above embodiments, FIG. 14 is a block diagram showing an optical multiplexer 140 used in the above embodiments, FIG. 15 is a block diagram showing an optical signal repeating and amplifying device in a thirteenth preferred embodiment according to the invention, FIG. 16 is a block diagram showing an optical signal repeating and amplifying device in a fourteenth preferred embodiment according to the invention, FIG. 17 is a block diagram showing an optical signal repeating and amplifying device in a fifteenth preferred embodiment according to the invention, FIG. 18 is a block diagram showing an optical signal repeating and amplifying device in a sixteenth preferred embodiment according to the invention, FIG. 19 is a block diagram showing an optical signal repeating and amplifying device in a seventeenth preferred embodiment according to the invention, FIG. 20 is a block diagram showing an optical signal repeating and amplifying device in an eighteenth second preferred embodiment according to the invention, FIG. 21 is a block diagram showing an optical signal repeating and amplifying device in a nineteenth preferred embodiment according to the invention, FIG. 22 is a block diagram showing an optical signal repeating and amplifying device in a twentieth preferred embodiment according to the invention, FIG. 23 is a block diagram showing an optical level adjusting device in a first preferred embodiment according to the invention, FIG. 24 is a block diagram showing an optical level adjusting device in a second preferred embodiment according to the invention, FIG. 25 is a block diagram showing an optical level adjusting device in a third preferred embodiment according to the invention, FIG. 26 is a block diagram showing an optical signal repeating and amplifying device in a twenty-first preferred embodiment according to the invention, FIG. 27 is a block diagram showing an optical signal repeating and amplifying device in a twenty-second preferred embodiment according to the invention, FIG. 28 is a block diagram showing an optical signal repeating and amplifying device in a twenty-third preferred embodiment according to the invention, FIG. 29 is a block diagram showing an optical signal repeating and amplifying device in a twenty-fourth second preferred embodiment according to the invention, FIG. 30 is a block diagram showing an optical signal repeating and amplifying device in a twenty-fifth preferred embodiment according to the invention, FIG. 31 is a block diagram showing an optical signal repeating and amplifying device in a twenty-sixth preferred embodiment according to the invention, FIG. 32 is a block diagram showing an optical level adjusting device in a fourth preferred embodiment according to the invention, FIG. 33 is a block diagram showing an optical level adjusting device in a fifth preferred embodiment according to the invention, FIG. 34 is a block diagram showing an optical level adjusting device in a sixth preferred embodiment according to the invention, FIG. 35 is a block diagram showing an optical level adjusting device in a seventh preferred embodiment according to the invention, FIG. 36 is a block diagram showing an optical level adjusting device in an eighth preferred embodiment according to the invention, FIG. 37 is a block diagram showing an optical level adjusting device in a ninth preferred embodiment according to the invention, and FIG. 38 is a block diagram showing an optical level adjusting device in a tenth preferred embodiment according to the invention,

DESCRIPTION OF THE PREFERRED EMBODIMENTS

An optical signal repeating and amplifying device in the first preferred embodiment will be explained in FIG. 1.

In the first embodiment. optical signals with four different wavelengths (for example, $\lambda 1=1548$ nm, $\lambda 2=1550$ nm, $\lambda 3=1552$ nm and $\lambda 4=1554$ nm, hereinafter these wavelengths are also used commonly in the other embodiments unless they are specified otherwise) are wavelength-multiplexed and transmitted through an optical transmission line 101. The optical transmission line 101 is connected to an optical amplifier 110, and the optical amplifier 110 is connected to an optical demultiplexer 120. The optical demultiplexer 120, which is typically an array waveguide diffraction grating type optical demultiplexer, demultiplexes the multiplexed optical signal into optical signals, each of which having either of the different wavelengths as a center signal-pass band. Further, optical transmission lines 131, 132, 133 and 134 as optical transmitting means are connected to the four output ports of the optical demultiplexer 120, and the ends of the optical transmission lines 131 to 134 are connected to an optical multiplexer 140 for multiplexing optical signals to be transmitted through the optical transmission lines 131 to 134. An optical transmission line 102 is connected to the output port of the optical multiplexer 140.

As the optical amplifier 110, a semiconductor optical amplifier or a impurity-doped optical fiber amplifier is suitably used. In particular, a rare-earth-element-doped optical fiber amplifier, such as an erbium-doped optical fiber amplifier, a neodymium-doped optical fiber amplifier and a praseodymium-doped optical fiber amplifier, is desirably used. Also, as the optical demultiplexer 120 and optical multiplexer 140, an optical demultiplexer-multiplexer in the narrow sense may be used other than an array waveguide diffraction grating type.

In operation, an optical signal supplied through the optical transmission line 101 is amplified by the optical amplifier 110, then demultiplexed into the respective wavelength lights ($\lambda 1$ to $\lambda 4$) by the optical demultiplexer 120, output to the respective optical transmission lines 131 to 134. In the optical demultiplexer 120 having an optical filter function, an ASE(amplitude spontaneous emission) noise from the optical amplifier 110 and an optical signal with a wavelength other than the above four wavelengths (λ1 to λ4) are removed. Therefore, only an optical signal with a single wavelength is passed through each of the optical transmission lines 131 to 134. The optical signals passed through the optical transmission lines 131 to 134 are multiplexed by the optical multiplexer 140, then output as a wavelength-multiplexed optical signal to the optical transmission line 102.

In the optical signal repeating and amplifying device in FIG. 1, the noise component of the wavelength-multiplexed optical signal to be output becomes very small. Therefore, the amount of a reduction in reception sensitivity after the transmission can be significantly improved. Due to this, the repeating distance can be elongated, thereby reducing the cost of optical transmission. Also, the optical signal is, as it is, repeated without converting into an electrical is signal. Therefore, the repeating installation can be simplified and the cost can be reduced thus much.

Further, the optical transmission property (optical filter function) with a narrow band width can be obtained by using an array waveguide diffraction grating as the optical demultiplexer 120 and optical multiplexer 140. Therefore, a high-density wavelength-multiplexed optical signal can be demultiplexed or multiplexed. Also, due to the applicability to high-density wavelength-multiplexed optical signal, the cost of optical transmission can be greatly reduced and the temperature control can be easily conducted.

An optical signal repeating and amplifying device in the second preferred embodiment will be explained in FIG. 2, wherein like parts are indicated by like reference numerals as used in FIG. 1.

In the second embodiment, optical signals with the four different wavelengths are wavelength-multiplexed and transmitted through the optical transmission line 101. The optical transmission line 101 is connected to an optical circulator 160 which has an input-output port connected to an optical transmission line 103 and an output port connected to an optical transmission line 102. The optical transmission line 103 is connected to an optical demultiplexer-multiplexer 170 with four output ports to output the optical signals with the respective wavelengths. The optical transmission lines 131 to 134 are connected to the four output ports of the optical demultiplexer-multiplexer 170. Optical reflecting mirrors 151 to 154 are connected to the ends of the optical transmission lines 131 to 134. The optical demultiplexer-multiplexer 170 is suitably an array waveguide diffraction grating type optical demultiplexer-multiplexer.

In operation, an optical signal supplied through the optical transmission line 101 is amplified by the optical amplifier 110, then input through the optical circulator 160 to the optical demultiplexer-multiplexer 170. The optical signal is demultiplexed into the respective wavelength lights (λ1 to λ4) by the optical demultiplexer-multiplexer 170, output separately to the respective optical transmission lines 131 to 134. In the optical demultiplexer-multiplexer 170 having an optical filter function, an ASE noise from the optical amplifier 110 and an optical signal with a wavelength other than the above four wavelengths (λ1 to λ4) are removed. Therefore, only an optical signal with a single wavelength is passed through each of the optical transmission lines 131 to 134.

The optical signals transmitted through the optical transmission lines 131 to 134 are reflected by the optical reflecting mirrors 151 to 154 connected to the ends of the optical transmission lines 131 to 134, transmitted reversely through the optical transmission lines 131 to 134, then input again to the optical demultiplexer-multiplexer 170. The optical demultiplexer-multiplexer 170 multiplexes the optical signals input through the optical transmission lines 131 to 134, outputting a wavelength-multiplexed optical signal. The wavelength-multiplexed optical signal is input to the optical circulator 160, then output through the optical transmission line 102 connected to the output port of the optical circulator 160.

Also in the optical signal repeating and amplifying device in FIG. 2, the noise component of the wavelength-multiplexed optical signal to be output becomes very small. Therefore, the amount of a reduction in reception sensitivity after the transmission can be significantly improved.

Further, the optical transmission property (optical filter function) with a narrow band width can be obtained by using an array waveguide diffraction grating as the optical demultiplexer-multiplexer 170. Thus, a high-density wavelength-multiplexed optical signal can be demultiplexed and multiplexed by only one optical demultiplexer-multiplexer. Also, due to the applicability to high-density wavelength-multiplexed optical signal, the cost of optical transmission can be greatly reduced and the temperature control can be easily conducted. Furthermore, the device composition can be simplified by using the optical reflecting mirrors 151 to 154 and can be fabricated inexpensively.

An optical signal repeating and amplifying device in the third preferred embodiment will be explained in FIG. 3, wherein like parts are indicated by like reference numerals as used in FIGS. 1 and 2.

In the third embodiment, the optical transmission line 101 is connected to the optical amplifier 110. The optical amplifier 110 is connected to the optical demultiplexer-multiplexer 170. The optical transmission lines 131 to 134 are connected to the four output ports of the optical demultiplexer-multiplexer 170. Optical couplers (optical dividers in the narrow sense) 141 to 144 are connected to the ends of the optical transmission lines 131 to 134. Further, an optical transmission line 145 is connected between the optical couplers 143 and 144, an optical transmission line 146 is connected between the optical couplers 144 and 141, an optical transmission line 147 is connected between the optical couplers 141 and 142, and an optical transmission line 148 is connected between the optical couplers 142 and 143.

In operation, an optical signal supplied through the optical transmission line 101 is amplified by the optical amplifier 110. Then, the output amplified is demultiplexed by the optical demultiplexer-multiplexer 170. In the optical demultiplexer-multiplexer 170, an ASE noise from the optical amplifier 110 and an optical signal with a wavelength other than the above four wavelengths (λ1 to λ4) are removed. Thus, the optical signals demultiplexed by the optical demultiplexer-multiplexer 170 are separately transmitted through the respective optical transmission lines 131 to 134, input to the optical couplers 141 to 144.

The optical signal with 1548 nm wavelength transmitted through the optical transmission line 131 is transmitted through the optical coupler 141 to the optical transmission line 132, again input through the optical transmission line 132 to the optical demultiplexer-multiplexer 170. In like manner, the other optical signals transmitted through the optical transmission lines 132 to 134 are also input to the optical demultiplexer-multiplexer 170. The optical signals input to the optical demultiplexer-multiplexer 170 are multiplexed into a wavelength-multiplexed optical signal, then output to the optical transmission line 102.

Also in the optical signal repeating and amplifying device in FIG. 3, the noise component of the wavelength-multiplexed optical signal to be output becomes very small. Therefore, the amount of a reduction in reception sensitivity after the transmission can be significantly improved.

An optical signal repeating and amplifying device in the fourth preferred embodiment will be explained in FIG. 4, wherein like parts are indicated by like reference numerals as used in FIG. 1.

In the fourth embodiment, a second optical amplifier 180 is provided on the output side of the optical multiplexer 140, adding to the composition in FIG. 1. The other components are the same as explained in the first embodiment.

In operation, an optical signal supplied through the optical transmission line 101 is amplified by the optical amplifier 110, then demultiplexed into the respective wavelength lights ($\lambda 1$ to $\lambda 4$) by the optical demultiplexer 120, output separately to the respective optical transmission lines 131 to 134. In the optical demultiplexer 120 having an optical filter function, an ASE noise from the optical amplifier 110 and an optical signal with a wavelength other than the above four wavelengths ($\lambda 1$ to $\lambda 4$) are removed. Therefore, only an optical signal with a single wavelength is passed through each of the optical transmission lines 131 to 134. The optical signals passed through the optical transmission lines 131 to 134 are multiplexed by the optical multiplexer 140, amplified secondarily by the optical amplifier 180, then output to the optical transmission line 102.

Also in the optical signal repeating and amplifying device in FIG. 4, the noise component of the wavelength-multiplexed optical signal to be output becomes very small. Therefore, the amount of a reduction in reception sensitivity after the transmission can be significantly improved. Further, due to the amplification by the second optical amplifier 180, a sufficient output level of wavelength-multiplexed optical signal can be obtained.

An optical signal repeating and amplifying device in the fifth preferred embodiment will be explained in FIG. 5, wherein like parts are indicated by like reference numerals as used in FIG. 2.

In the fifth embodiment, the second optical amplifier 180 is provided on the output side of the optical circulator 160, adding to the composition in FIG. 2. The other components and their operations are the same as explained in the second embodiment.

In this embodiment, an ASE noise and an optical signal with a wavelength other than the above four wavelengths ($\lambda 1$ to $\lambda 4$) are removed by the optical demultiplexer-multiplexer 170 and the wavelength-multiplexed optical signal is again amplified by the optical amplifier 180 provided after the optical circulator 160. Therefore, the noise component of the wavelength-multiplexed optical signal to be output from the optical circulator 160 becomes very small. Therefore, the amount of a reduction in reception sensitivity after the transmission can be significantly improved. Further, due to the amplification by the second optical amplifier 180, a sufficient output level of wavelength-multiplexed optical signal can be obtained.

An optical signal repeating and amplifying device in the sixth preferred embodiment will be explained in FIG. 6, wherein like parts are indicated by like reference numerals as used in FIG. 3.

In the sixth embodiment, the second optical amplifier 180 is provided on the output side of the optical demultiplexer-multiplexer 170, adding to the composition in FIG. 3. The other components and their operations are the same as explained in the third embodiment.

In this embodiment, an ASE noise and an optical signal with a wavelength other than the above four wavelengths ($\lambda 1$ to $\lambda 4$) are removed by the optical demultiplexer-multiplexer 170. For example, the optical signal with 1548 nm wavelength transmitted through the optical transmission line 131 is transmitted through the optical coupler 141 to the optical transmission line 132, again input through the optical transmission line 132 to the optical demultiplexer-multiplexer 170. In like manner, the other optical signals transmitted through the optical transmission lines 132 to 134 are also input to the optical demultiplexer-multiplexer 170. The optical signals input to the optical demultiplexer-multiplexer 170 are multiplexed into a wavelength-multiplexed optical signal, again amplified by the optical amplifier 180, then output to the optical transmission line 102.

Also in the optical signal repeating and amplifying device in FIG. 6, the noise component of the wavelength-multiplexed optical signal to be output from the optical demultiplexer-multiplexer 170 becomes very small. Therefore, the amount of a reduction in reception sensitivity after the transmission can be significantly improved. Further, due to the amplification by the second optical amplifier 180, a sufficient output level of wavelength-multiplexed optical signal can be obtained.

An optical signal repeating and amplifying device in the seventh preferred embodiment will be explained in FIG. 7, wherein like parts are indicated by like reference numerals as used in FIGS. 1 and 4.

In the seventh embodiment, the optical amplifier 110 in FIG. 1 is disposed moving on the output side of the optical multiplexer 140. The other components and their operations are the same as explained in the first or fourth embodiment.

In this embodiment, the effect of an ASE noise from the optical amplifier 110 does not appear because the optical amplifier 110 is disposed on the output side of the optical multiplexer 140. Thus, an ASE noise included when inputting and an optical signal with a wavelength other than the above four wavelengths ($\lambda 1$ to $\lambda 4$) are removed while passing through the optical multiplexer 140. Therefore, only an optical signal with a single wavelength is passed through each of the optical transmission lines 131 to 134. The optical signals passed through the optical transmission lines 131 to 134 are multiplexed into a wavelength-multiplexed optical signal by the optical multiplexer 140, amplified by the optical amplifier 110, then output as a wavelength-multiplexed optical signal to the optical transmission line 102. Meanwhile, an ASE noise occurred at the optical amplifier 110 can be removed by any of optical signal repeating and amplifying devices in the above embodiments to be disposed at the following stage.

Also in the optical signal repeating and amplifying device in FIG. 7, the noise component of the wavelength-multiplexed optical signal to be output becomes very small. Therefore, the amount of a reduction in reception sensitivity after the transmission can be significantly improved.

An optical signal repeating and amplifying device in the eighth preferred embodiment will be explained in FIG. 8, wherein like parts are indicated by like reference numerals as used in FIGS. 2 and 5.

In the eighth embodiment, the optical amplifier 110 in FIG. 2 is disposed moving on the output side of the optical circulator 160. The other components and their operations are the same as explained in the second or fifth embodiment.

Also in this embodiment, the effect of an ASE noise from the optical amplifier 110 does not appear because the optical amplifier 110 is disposed on the output side of the optical circulator 160. Thus, an ASE noise included when inputting and an optical signal with a wavelength other than the above four wavelengths (λ1 to λ4) are removed while passing through the optical demultiplexer-multiplexer 170. Therefore, only an optical signal with a single wavelength is passed through each of the optical transmission lines 131 to 134. The optical signals transmitted through the optical transmission lines 131 to 134 are reflected by the optical reflecting mirrors 151 to 154 connected to the ends of the optical transmission lines 131 to 134, transmitted reversely through the optical transmission lines 131 to 134, then input again to the optical demultiplexer-multiplexer 170. The optical demultiplexer-multiplexer 170 multiplexes the optical signals input through the optical transmission lines 131 to 134, outputting a wavelength-multiplexed optical signal. The wavelength-multiplexed optical signal is input to the optical circulator 160, amplified by the optical amplifier 110, then output to the optical transmission line 102. Also in this case, an ASE noise occurred at the optical amplifier 110 can be removed by any of optical signal repeating and amplifying devices in the above embodiments to be disposed at the following stage.

Also in the optical signal repeating and amplifying device in FIG. 8, the noise component of the wavelength-multiplexed optical signal to be output becomes very small. Therefore, the amount of a reduction in reception sensitivity after the transmission can be significantly improved.

An optical signal repeating and amplifying device in the ninth preferred embodiment will be explained in FIG. 9, wherein like parts are indicated by like reference numerals as used in FIGS. 3 and 6.

In the ninth embodiment, the optical amplifier 110 in FIG. 3 is disposed moving on the output side of the optical demultiplexer-multiplexer 170. The other components and their operations are the same as explained in the third embodiment.

In this embodiment, the effect of an ASE noise from the optical amplifier 110 does not appear because the optical amplifier 110 is disposed on the output side of the optical demultiplexer-multiplexer 170. Thus, an ASE noise included when inputting and an optical signal with a wavelength other than the above four wavelengths (λ1 to λ4) are removed while passing through the optical demultiplexer-multiplexer 170. Therefore, only an optical signal with a single wavelength is passed through each of the optical transmission lines 131 to 134. The optical signal transmitted through each of the optical transmission lines 131 to 134 to the end is transmitted through any of the optical couplers 141 to 144 connected thereto to the adjacent optical transmission line, again input through the optical transmission line to the optical demultiplexer-multiplexer 170. The optical signals input to the optical demultiplexer-multiplexer 170 are multiplexed into a wavelength-multiplexed optical signal, amplified by the optical amplifier 110, then output to the optical transmission line 102.

Also in the optical signal repeating and amplifying device in FIG. 9, the noise component of the wavelength-multiplexed optical signal to be output becomes very small. Therefore, the amount of a reduction in reception sensitivity after the transmission can be significantly improved.

An optical signal repeating and amplifying device in the tenth preferred embodiment will be explained in FIG. 10.

The optical transmission line 101 is connected to the optical amplifier 110, and the optical amplifier 110 is connected to an optical coupler (optical divider in the narrow sense) 190. The optical transmission lines 131 to 134 are connected to the optical coupler 190, and band-pass optical filters 201 to 204 each of which serves as an optical filter (optical filtering means) to pass only a wavelength band corresponding to each of the four wavelengths (λ1 to λ4) are inserted into the optical transmission lines 131 to 134. The ends of the optical transmission lines 131 to 134 are connected to an optical coupler (optical coupler in the narrow sense) 210, and the optical coupler 210 is connected to optical transmission line 102.

In operation, an optical signal supplied through the optical transmission line 101 is amplified by the optical amplifier 110, then input to the optical coupler 190, output separately to the optical transmission lines 131 to 134. An ASE noise from the optical amplifier 110 and an optical signal with a wavelength other than the above four wavelengths (λ1 to λ4) are removed by the band-pass optical filters 201 to 204 on the optical transmission lines 131 to 134. Therefore, only an optical signal with a single wavelength is transmitted through each of the optical transmission lines 131 to 134 after passing through the band-pass optical filters 201 to 204. The optical signals transmitted through the optical transmission lines 131 to 134 are coupled by the optical coupler 210, then output to the optical transmission line 102. In this composition, the optical coupler 190 serves as an optical divider (or demultiplexer) and the optical coupler 210. serves as an optical coupler.

In the optical signal repeating and amplifying device in FIG. 10, the noise component of the wavelength-multiplexed optical signal to be output becomes very small. Therefore, the amount of a reduction in reception sensitivity after the transmission can be significantly improved.

Meanwhile, the optical amplifier 110 may be disposed on the output side of the optical coupler 210 or a second optical amplifier, adding to the optical amplifier 110, may be provided on the output side of the optical coupler 210.

An optical signal repeating and amplifying device in the eleventh preferred embodiment will be explained in FIG. 11, wherein like parts are indicated by like reference numerals as used in FIG. 2.

In the eleventh embodiment, adding to the device composition of the second embodiment in FIG. 2, the band-pass optical filters 201 to 204 in FIG. 10 are inserted into the optical transmission lines 131 to 134. The optical coupler 190 in FIG. 11 serves as an optical divider-coupler.

In this embodiment, an ASE noise from the optical amplifier 110 and an optical signal with a wavelength other than the above four wavelengths (λ1 to λ4) are removed by the band-pass optical filters 201 to 204 on the optical transmission lines 131 to 134. Therefore, only an optical signal with a single wavelength is transmitted through each of the optical transmission lines 131 to 134 after passing through the band-pass optical filters 201 to 204.

The optical signals transmitted through the optical transmission lines 131 to 134 are reflected by the optical reflecting mirrors 151 to 154 connected on the output sides of the optical transmission lines 131 to 134. transmitted reversely through the optical coupler 190, input to the optical coupler 190, coupled (multiplexed) into a wavelength-multiplexed optical signal by the optical coupler 190. The wavelength-multiplexed optical signal is sent through the input-output port to the output port of the optical circulator 160, then output to the optical transmission line 102.

Also in the optical signal repeating and amplifying device in FIG. 11, the noise component of the wavelength-multiplexed optical signal to be output becomes very small.

Therefore, the amount of a reduction in reception sensitivity after the transmission can be significantly improved.

Meanwhile, in this embodiment, the optical amplifier 110 may be disposed on the output side of the optical circulator 160 as shown in FIG. 8 or a second optical amplifier, adding to the optical amplifier 110, may be provided on the output side of the optical circulator 160 as shown in FIG. 5.

An optical signal repeating and amplifying device in the twelfth preferred embodiment will be explained in FIG. 12, wherein like parts are indicated by like reference numerals as used in FIGS. 3 and 10.

In the twelfth embodiment, the optical demultiplexer-multiplexer 170 in FIG. 3 is replaced by the optical coupler (optical divider-coupler) 190, and the band-pass optical filters 201, 202, 203 and 204 are inserted into the optical transmission lines 145, 146, 147 and 148, respectively, in FIG. 3.

From the optical signals supplied through the optical coupler 190 to the optical transmission lines 131 to 134, an ASE noise from the optical amplifier 110 and an optical signal with a wavelength other than the above four wavelengths (λ1 to λ4) are removed by the band-pass optical filters 201 to 204 on the optical transmission lines 145 to 148. For example, the optical signal with 1548 nm wavelength to pass through the optical transmission line 131 is sent through the optical couplers 144, 141 and the optical transmission lines 132 into which the band-pass optical filter 201 is inserted to the optical coupler 190. In like manner, the other optical signals to pass through the optical transmission lines 132 to 134 are also sent to the optical coupler 190. The respective optical signals input to the optical coupler 190 are coupled into a wavelength-multiplexed optical signal, then output to the optical transmission line 102.

In the optical signal repeating and amplifying device in FIG. 12, the noise component of the wavelength-multiplexed optical signal to be output becomes very small. Therefore, the amount of a reduction in reception sensitivity after the transmission can be significantly improved.

Next, the optical demultiplexer 120 and optical multiplexer 140 used in some of the above embodiments will be detailed.

FIG. 13 shows the detailed composition of the optical demultiplexer 120.

The optical demultiplexer 120 comprises optical transmission lines 1000 and 1001 to 1064, an optical isolator 1100, an optical coupler (optical divider in the narrow sense) 1200, optical circulators 1301, 1302, and fiber gratings 1401 to 1406.

The wavelength-multiplexed optical signal that four optical signals (λ1, λ2, λ3 and λ4) are multiplexed is supplied to the optical transmission line 1000. The wavelength-multiplexed optical signal from the optical transmission line 1000 is passed through the optical isolator 1100, then divided into two lights. For example, the optical signal with the first wavelength (λ1) is output through the fiber gratings 1402, 1404, the optical circulator 1301 and the fiber grating 1405 to the optical transmission line 1001. However, the optical signal with the second wavelength (λ2) is not output to the optical transmission lines 1001, 1002 because it is reflected by the fiber grating 1402. Also, the optical signal with the third wavelength (λ3) is passed through the fiber gratings 1402, 1404 and the optical circulator 1301, then reflected by the fiber grating 1405, input again to the input-output port of the optical circulator 1301, then output from the output port of the optical circulator 1301 to the optical transmission line 1002. In like manner, the other optical signals with wavelengths (λ2, λ4) are output to the optical transmission lines 1003, 1004 while being demultiplexed.

FIG. 14 shows the detailed composition of the optical multiplexer 140.

The optical multiplexer 140 comprises optical transmission lines 2000 and 2001 to 2004, an optical isolator 2100, an optical coupler (optical coupler in the narrow sense) 2200, optical circulators 2301, 2302, and fiber gratings 2401 to 2406.

The optical signal with the first wavelength (λ1) to be input to the optical transmission line 2001 is output through the fiber grating 2405, the optical circulator 2301, the fiber gratings 2404, 2402 and the optical coupler 2200 to the optical transmission line 2000. Also, the optical signal with the third wavelength (λ3) to be input to the optical transmission line 2002 is input to the input port of the optical circulator 2301, then output from the input-output port of the optical circulator 2301 to the optical transmission line 2001, then reflected by the fiber grating 2405, passed through the optical circulator 2301 again, the fiber gratings 2404, 2402 and the optical coupler 2200 to the optical transmission line 2000. In like manner, the other optical signals with wavelengths (λ2, λ4) are output to the optical transmission line 2000 while being multiplexed.

By using the composition in FIG. 13, a wavelength-multiplexed optical signal can be demultiplexed further densely than the optical demultiplexer-multiplexer using an array waveguide diffraction grating. Therefore, the large-capacity optical transmission can be performed. Hereinafter, the optical demultiplexer and the optical multiplexer shown in FIGS. 13 and 14 are referred to as 'fiber-grating type' so as to distinguish them from 'array waveguide diffraction grating type'.

An optical signal repeating and amplifying device in the thirteenth preferred embodiment will be explained in FIG. 15, wherein like parts are indicated by like reference numerals as used in FIG. 1.

In the thirteenth embodiment, the optical demultiplexer 120 in FIG. 1 is replaced by a fiber-grating type optical demultiplexer 220 and the optical multiplexer 140 in FIG. 1 is replaced by a fiber-grating type optical, multiplexer 230. The other components are the same as explained in the first embodiment. The fiber-grating type optical demultiplexer 220 has the composition in FIG. 13 and the fiber-grating type optical multiplexer 230 has the composition in FIG. 14. The optical amplifier 110 may be a semiconductor optical amplifier, an impurity-doped optical fiber amplifier etc. like the first embodiment.

The wavelength-multiplexed optical signal with the four wavelengths (λ1 to λ4) supplied through the optical transmission line 101 is amplified by the optical amplifier 110, then input to the fiber-grating type optical demultiplexer 220, output separately to the optical transmission lines 131 to 134 while being demultiplexed into the respective wavelengths.

In the fiber-grating type optical demultiplexer 220, an ASE noise from the optical amplifier 110 and an optical signal with a wavelength other than the above four wavelengths (λ1 to λ4) are removed. Therefore, only an optical signal with a single wavelength is transmitted through each of the optical transmission lines 131 to 134.

In the optical signal repeating and amplifying device in FIG. 15, the noise component of the wavelength-multiplexed optical signal to be output becomes very small. Therefore, the amount of a reduction in reception sensitivity after the transmission can be significantly improved. As a result, the repeating distance can be elongated and the cost of optical transmission can be reduced. Also, the optical signal is, as it is, repeated without converting into an electrical signal. Therefore, the repeating installation can be simplified and the cost can be reduced thus much.

Further, the optical transmission property (optical filter function) with a narrow band width can be obtained by using the fiber-grating type optical demultiplexer 220 and optical multiplexer 230. Therefore, a high-density wavelength-multiplexed optical signal can be demultiplexed or multiplexed. Also, due to the applicability to high-density wavelength-multiplexed optical signal, the cost of optical transmission can be greatly reduced and the temperature control can be easily conducted.

An optical signal repeating and amplifying device in the fourteenth preferred embodiment will be explained in FIG. 16, wherein like parts are indicated by like reference numerals as used in FIG. 2.

In the fourteenth embodiment, the optical demultiplexer-multiplexer 170 in FIG. 2 is replaced by a fiber-grating type optical demultiplexer-multiplexer 240. The other components are the same as explained in the second embodiment.

The fiber-grating type optical demultiplexer-multiplexer 240 demultiplexes the wavelength-multiplexed optical signal supplied through the optical circulator 160 into the respective wavelength lights ($\lambda 1$ to $\lambda 4$), outputting them separately to the optical transmission lines 131 to 134. The fiber-grating type optical demultiplexer-multiplexer 240 with an optical filter function removes an ASE noise from the optical amplifier 110 and an optical signal with a wavelength other than the above four wavelengths ($\lambda 1$ to $\lambda 4$)

In the optical signal repeating and amplifying device in FIG. 16, the noise component of the wavelength-multiplexed optical signal to be output becomes very small. Therefore, the amount of a reduction in reception sensitivity after the transmission can be significantly improved. Further, the optical transmission property (optical filter function) with a narrow band width can be obtained by using the fiber-grating type optical demultiplexer-multiplexer 240. Thus, a high-density wavelength-multiplexed optical signal can be demultiplexed and multiplexed by only one optical demultiplexer-multiplexer. Also, due to the applicability to high-density wavelength-multiplexed optical signal, the cost of optical transmission can be greatly reduced and the temperature control can be easily conducted. Furthermore, the device composition can be simplified by using the optical reflecting mirrors 151 to 154 and can be fabricated inexpensively.

An optical signal repeating and amplifying device in the fifteenth preferred embodiment will be explained in FIG. 17, wherein like parts are indicated by like reference numerals as used in FIG. 3.

In the fifteenth embodiment, the optical demultiplexer-multiplexer 170 in FIG. 2 is replaced by the fiber-grating type optical demultiplexer-multiplexer 240. The other components are the same as explained in the third embodiment.

The fiber-grating type optical demultiplexer-multiplexer 240 removes an ASE noise from the optical amplifier 110 and an optical signal with a wavelength other than the above four wavelengths ($\lambda 1$ to $\lambda 4$). Thereafter, for example, the optical signal passing through the optical transmission line 131 is again input through the optical coupler 144 and the optical transmission line 132 to the fiber-grating type optical demultiplexer-multiplexer 240. In like manner, the other optical signals passing through the optical transmission lines 132 to 134 are also input to the fiber-grating type optical demultiplexer-multiplexer 240. The fiber-grating type optical demultiplexer-multiplexer 240 multiplexes the optical signals supplied from the optical transmission lines 131 to 134 into a wavelength-multiplexed optical signal, then outputting it to the optical transmission line 102.

Also in the optical signal repeating and amplifying device in FIG. 17, the noise component of the wavelength-multiplexed optical signal to be output becomes very small. Therefore, the amount of a reduction in reception sensitivity after the transmission can be significantly improved.

An optical signal repeating and amplifying device in the sixteenth preferred embodiment will be explained in FIG. 18, wherein like parts are indicated by like reference numerals as used in FIG. 4.

In the sixteenth embodiment, the optical demultiplexer 120 in FIG. 4 is replaced by the fiber-grating type optical demultiplexer 220 and the optical multiplexer 140 in FIG. 4 is replaced by the fiber-grating type optical multiplexer 230. The other components are the same as explained in the fourth embodiment.

The fiber-grating type optical demultiplexer 220 removes an ASE noise from the optical amplifier 110 and an optical signal with a wavelength other than the above four wavelengths ($\lambda 1$ to $\lambda 4$). The optical signals passing through the optical transmission lines 131 to 134 are multiplexed into a wavelength-multiplexed optical signal, further amplified by the optical amplifier 180, then output to the optical transmission line 102.

Also in the optical signal repeating and amplifying device in FIG. 18, the noise component of the wavelength-multiplexed optical signal to be output from the fiber-grating type optical multiplexer 230 becomes very small. Therefore, the amount of a reduction in reception sensitivity after the transmission can be significantly improved.

An optical signal repeating and amplifying device in the seventeenth preferred embodiment will be explained in FIG. 19, wherein like parts are indicated by like reference numerals as used in FIG. 5.

In the seventeenth embodiment, the optical demultiplexer-multiplexer 170 in FIG. 5 is replaced by the fiber-grating type optical demultiplexer-multiplexer 240. The other components are the same as explained in the fifth embodiment.

The fiber-grating type optical demultiplexer-multiplexer 240 removes an ASE noise from the optical amplifier 110 and an optical signal with a wavelength other than the above four wavelengths ($\lambda 1$ to $\lambda 4$). Namely, only an optical signal with a single wavelength is transmitted through each of the optical transmission lines 131 to 134.

Also in the optical signal repeating and amplifying device in FIG. 19, the noise component of the wavelength-multiplexed optical signal to be output becomes very small. Therefore, the amount of a reduction in reception sensitivity after the transmission can be significantly improved.

An optical signal repeating and amplifying device in the eighteenth preferred embodiment will be explained in FIG. 20, wherein like parts are indicated by like reference numerals as used in FIG. 6.

In the eighteenth embodiment, the optical demultiplexer-multiplexer 170 in FIG. 6 is replaced by the fiber-grating type optical demultiplexer-multiplexer 240. The other components are the same as explained in the sixth embodiment.

The fiber-grating type optical demultiplexer-multiplexer 240 removes an ASE noise from the optical amplifier 110 and an optical signal with a wavelength other than the above four wavelengths (λ1 to λ4). The optical signals to be output from the fiber-grating type optical demultiplexer-multiplexer 240 are transmitted through the optical transmission lines 131 to 134, reversely input through the optical couplers 141 to 144 and the different optical transmission lines to the fiber-grating type optical demultiplexer-multiplexer 240, multiplexed into a wavelength-multiplexed optical signal.

Also in the optical signal repeating and amplifying device in FIG. 20, the noise component of the wavelength-multiplexed optical signal to be output becomes very small. Therefore, the amount of a reduction in reception sensitivity after the transmission can be significantly improved.

An optical signal repeating and amplifying device in the nineteenth preferred embodiment will be explained in FIG. 21, wherein like parts are indicated by like reference numerals as used in FIG. 7.

In the eighteenth embodiment, the optical demultiplexer 120 in FIG. 7 is replaced by the fiber-grating type optical demultiplexer 220 and the optical multiplexer 140 in FIG. 7 is replaced by the fiber-grating type optical multiplexer 230. The other components are the same as explained in the seventh embodiment.

In this composition, the optical amplifier 110 is not provided on the input side. Therefore, the fiber-grating type optical demultiplexer 220 removes an ASE noise from the optical amplifier of a previous-stage optical signal repeating and amplifying device, and it further removes an optical signal with a wavelength other than the above four wavelengths (λ1 to λ4). Namely, only an optical signal with a single wavelength is transmitted through each of the optical transmission lines 131 to 134. The optical signals demultiplexed by the fiber-grating type optical demultiplexer 220 are multiplexed into a wavelength-multiplexed optical signal by the fiber-grating type optical multiplexer 230, amplified by the optical amplifier 110, output to the optical transmission line 102.

Also in the optical signal repeating and amplifying device in FIG. 21, the noise component of the wavelength-multiplexed optical signal to be output becomes very small. Therefore, the amount of a reduction in reception sensitivity after the transmission can be significantly improved.

An optical signal repeating and amplifying device in the twentieth preferred embodiment will be explained in FIG. 22, wherein like parts are indicated by like reference numerals as used in FIG. 20.

In the twentieth embodiment, the optical amplifier 110 in FIG. 20 is removed.

In this composition, the optical amplifier 110 is not provided on the input side. Therefore, the fiber-grating type optical demultiplexer-multiplexer 240 removes an ASE noise from the optical amplifier of a previous-stage optical signal repeating and amplifying device, and it further removes an optical signal with a wavelength other than the above four wavelengths (λ1 to λ4). Namely, only an optical signal with a single wavelength is transmitted through each of the optical transmission lines 131 to 134.

Also in the optical signal repeating and amplifying device in FIG. 22, the noise component of the wavelength-multiplexed optical signal to be output becomes very small. Therefore, the amount of a reduction in reception sensitivity after the transmission can be significantly improved.

An optical level adjusting device in the first preferred embodiment will be explained in FIG. 23.

In the first embodiment, optical signals with four different wavelengths (for example, λ1=1548 nm, λ2=1550 nm, λ3=1552 nm and λ4=1554 nm, hereinafter these wavelengths are also used commonly in the other embodiments) are wavelength-multiplexed and transmitted through an optical transmission line 101.

The optical transmission line 101 is connected to the optical demultiplexer 120. The optical demultiplexer 120, which is typically an array waveguide diffraction grating type optical demultiplexer, demultiplexes the multiplexed optical signal into optical signals, each of which having either of the different wavelengths as a center signal-pass band. Further, the optical transmission lines 131, 132, 133 and 134 are connected to the four output ports of the optical demultiplexer 120, and the ends of the optical transmission lines 131 to 134 are connected to the optical multiplexer 140 for multiplexing optical signals to be transmitted through the optical transmission lines 131 to 134. The optical transmission line 102 is connected to the output port of the optical multiplexer 140. Further, optical attenuators 251 to 254 are inserted into the optical transmission lines 131 to 134, respectively.

As the optical demultiplexer 120 and optical multiplexer 140, array waveguide diffraction grating type optical demultiplexer and multiplexer can be suitably used. Alternatively, they may be an optical demultiplexer-multiplexer. Also, as the optical attenuators 251 to 254, an optical variable attenuator or optical fixed attenuator may be used.

In operation, an optical signal transmitted through the optical transmission line 101 is demultiplexed into four optical signals with the above wavelengths (λ1 to λ4) by the optical demultiplexer 120. The optical demultiplexer 120 removes an ASE noise from the optical amplifier(not shown) of a previous-stage optical signal repeating and amplifying device or optical level adjusting device, and it further removes an optical signal with a wavelength other than the above four wavelengths (λ1 to λ4). Namely, only an optical signal with a single wavelength is transmitted through each of the optical transmission lines 131 to 134. Then, the respective optical signals transmitted through the optical transmission lines 131 to 134 are separately attenuated by the optical attenuators 251 to 254 inserted into the optical transmission lines 131 to 134 to adjust the relative or absolute level of the optical signals. Then, the optical signals are multiplexed into a wavelength-multiplexed optical signal by the optical multiplexer 140, output to the optical transmission line 102.

In the optical level adjusting device in FIG. 23, the optical level of the respective wavelength lights in the wavelength-multiplexed optical signal can be adjusted into an arbitrary level by the optical attenuators 251 to 254.

An optical level adjusting device in the second preferred embodiment will be explained in FIG. 24.

The optical transmission line 101 is connected to the optical circulator 160 that has an input port, an input-output port connected with the optical transmission line 103 and an output port connected with the optical transmission line 102. The optical transmission line 103 is connected to the optical demultiplexer-multiplexer 170 that has four output ports to output the optical signals with the above wavelengths (λ1 to λ4). The output ports of the optical demultiplexer-multiplexer 170 are connected with the optical transmission lines 131 to 134, and the optical reflecting mirrors 151 to 154 are connected to the ends of the optical transmission lines 131 to 134. Further, optical attenuators 251 to 254 are inserted into the optical transmission lines 131 to 134, respectively.

As the optical demultiplexer-multiplexer 170, an array waveguide diffraction grating type optical demultiplexer-multiplexer can be suitably used. Also, as the optical attenuators 251 to 254, an optical variable attenuator or optical fixed attenuator may be used.

In operation, an optical signal transmitted through the optical transmission line 101 is input through the optical circulator 160 to the optical demultiplexer-multiplexer 170, demultiplexed into four optical signals with the above wavelengths (λ1 to λ4) by the optical demultiplexer-multiplexer 170, output separately to the optical transmission lines 131 to 134. The optical demultiplexer-multiplexer 170 removes an ASE noise from the optical amplifier(not shown) of a previous-stage optical signal repeating and amplifying device or optical level adjusting device, and it further removes an optical signal with a wavelength other than the above four wavelengths (λ1 to λ4). Namely, only an optical signal with a single wavelength is transmitted through each of the optical transmission lines 131 to 134. Then, the respective optical signals transmitted through the optical transmission lines 131 to 134 are separately attenuated by the optical attenuators 251 to 254 inserted into the optical transmission lines 131 to 134 to adjust the relative or absolute level of the optical signals. Then, the optical signals output from the optical attenuators 251 to 254 are reflected by the optical reflecting mirrors 151 to 154, transmitted reversely through the optical transmission lines 131 to 134, input to the optical demultiplexer-multiplexer 170. The optical demultiplexer-multiplexer 170 multiplexes the optical signals from the optical transmission lines 131 to 134 into a wavelength-multiplexed optical signal. The wavelength-multiplexed optical signal is input to the optical circulator 160, output from the output port to the optical transmission line 102.

In the optical level adjusting device in FIG. 24, the optical level of the respective wavelength lights in the wavelength-multiplexed optical signal to be output from the optical circulator 160 can be adjusted into an arbitrary level by the optical attenuators 251 to 254. Thus, the optical level can be properly adjusted even when the optical levels to the respective wavelengths are extremely different.

An optical level adjusting device in the third preferred embodiment will be explained in FIG. 25.

The optical transmission line 101 is connected to the optical demultiplexer-multiplexer 170, and the optical transmission lines 131, 132, 133 and 134 are connected to the four output ports of the optical demultiplexer-multiplexer 170. The optical couplers 144, 141, 142 and 143 are connected to the ends of the optical transmission lines 131 to 134, respectively. Further, the optical transmission line 145 is connected between the optical couplers 143 and 144, the optical transmission line 146 is connected between the optical couplers 144 and 141, the optical transmission line 147 is connected between the optical couplers 141 and 142, and the optical transmission line 148 is connected between the optical couplers 142 and 143. Also, the optical attenuator 251 is inserted between the optical couplers 141 and 144, the optical attenuator 252 is inserted between the optical couplers 141 and 142, the optical attenuator 253 is inserted between the optical couplers 142 and 143, and the optical attenuator 254 is inserted between the optical couplers 143 and 144.

In operation, an optical signal transmitted through the optical transmission line 101 is demultiplexed into four optical signals with the above wavelengths (λ1 to λ4) by the optical demultiplexer multiplexer 170. The optical demultiplexer 170 removes an ASE noise included in the optical signals and an optical signal with a wavelength other than the above four wavelengths (λ1 to λ4). Then, the respective optical signals demultiplexed by the optical demultiplexer-multiplexer 170 are separately transmitted through the optical transmission lines 131 to 134, attenuated by the optical attenuators 251 to 254. For example, the optical signal with 1548 nm wavelength transmitted through the optical transmission line 131 is attenuated by the optical attenuator 251, passed through the optical coupler 141 to the optical transmission line 132, input through the optical transmission line 132 to the optical demultiplexer-multiplexer 170. In like manner, the other optical signals transmitted through the optical transmission lines 132 to 134 are also input to the optical demultiplexer-multiplexer 170. Then, the optical signals are multiplexed into a wavelength-multiplexed optical signal by the optical demultiplexer-multiplexer 170, output to the optical transmission line 102.

In the optical level adjusting device in FIG. 25, the optical level of the respective wavelength lights in the wavelength-multiplexed optical signal can be adjusted into an arbitrary level by the optical attenuators 251 to 254.

An optical signal repeating and amplifying device in the twenty-first preferred embodiment will be explained in FIG. 26, wherein like parts are indicated by like reference numerals as used in FIG. 1.

In the twenty-first embodiment, optical amplifiers 261 to 264 are inserted into the optical transmission lines 131 to 134, respectively, in FIG. 1. The other components are the same as explained in the first embodiment.

An optical signal supplied through the optical transmission line 101 is demultiplexed by the optical demultiplexer 120, output to the optical transmission lines 131 to 134. Then, for example, the optical signal with 1548 nm wavelength to be output to the optical transmission line 131 is amplified by the optical amplifier 261, input to the optical multiplexer 140. The optical multiplexer 140 removes an ASE noise included in a previous-stage optical signal repeating and amplifying device or optical level adjusting device and an optical signal with a wavelength other than the above four wavelengths (λ1 to λ4). In like manner, the other optical signals to be transmitted through the optical transmission lines 132 to 134 are also processed.

In the optical signal repeating and amplifying device in FIG. 26. the total output power after wavelength-multiplexing can be increased comparing with the optical signal repeating and amplifying devices in the above embodiments that the wavelength-multiplexed optical signal is amplified in the lump because the optical amplifiers 261 to 264 are inserted into the optical transmission lines 131 to 134, respectively. Furthermore, the equalization of optical levels can be also conducted. Also, an ASE noise generated from the optical amplifier, which causes a reduction in reception sensitivity, can be removed by the optical multiplexer 140 with a narrow pass-band width that is disposed after the optical amplifier and functions as an optical filter.

An optical signal repeating and amplifying device in the twenty-second preferred embodiment will be explained in FIG. 27, wherein like parts are indicated by like reference numerals as used in FIG. 2.

In the twenty-first embodiment, the optical amplifier 110 in FIG. 2 is removed and the optical amplifiers 261 to 264 are inserted into the optical transmission lines 131 to 134, respectively, in FIG. 2. The other components are the same as explained in the second embodiment.

An optical signal supplied through the optical circulator 160 is demultiplexed by the optical demultiplexer-multiplexer 170, output separately to the optical transmission lines 131 to 134. Then, for example. the optical signal with 1548 nm wavelength to be output to the optical transmission line 131 is amplified by the optical amplifier 261, reflected by the optical reflecting mirror 151, again amplified by the optical amplifier 261, input to the optical demultiplexer-multiplexer 170. The optical demultiplexer-multiplexer 170 removes an ASE noise from the optical amplifier 261 and an optical signal with a wavelength other than the above four wavelengths ($\lambda 1$ to $\lambda 4$). In like manner, the other optical signals to be transmitted through the optical transmission lines 132 to 134 are also processed.

Also in the optical signal repeating and amplifying device in FIG. 27, the total output power after wavelength-multiplexing can be increased comparing with the optical signal repeating and amplifying devices in the above embodiments that the wavelength-multiplexed optical signal is amplified in the lump because the optical amplifiers 261 to 264 are inserted into the optical transmission lines 131 to 134, respectively. Furthermore, the equalization of optical levels can be also conducted. Also, an ASE noise generated from the optical amplifier, which causes a reduction in reception sensitivity, can be removed by the optical demultiplexer-multiplexer 170 that functions as an optical filter.

An optical signal repeating and amplifying device in the twenty-third preferred embodiment will be explained in FIG. 28, wherein like parts are indicated by like reference numerals as used in FIGS. 1 to 27.

The optical demultiplexer-multiplexer 170 is connected with the optical transmission lines 101, 102. The optical transmission lines 131 to 134 are connected to the wavelength-demultiplexing side of the optical demultiplexer-multiplexer 170. The optical couplers 144, 141, 142 and 143 are connected to the ends of the optical transmission lines 131 to 134, respectively. Further, the optical amplifier 261 and an optical isolator 271 that are in series connected are inserted between the optical couplers 141 and 144, the optical amplifier 262 and an optical isolator 272 that are in series connected are inserted between the optical couplers 141 and 142, the optical amplifier 263 and an optical isolator 273 that are in series connected are inserted between the optical couplers 142 and 143, and the optical amplifier 264 and an optical isolator 274 that are in series connected are inserted between the optical couplers 143 and 144.

In operation, an optical signal supplied through the optical transmission line 101 is demultiplexed into optical signals with four wavelengths ($\lambda 1$ to $\lambda 4$) by the optical demultiplexer-multiplexer 170, output separately to the optical transmission lines 131 to 134. Then, for example, the optical signal with 1548 nm wavelength to be output to the optical transmission line 131 is passed through the optical coupler 144, amplified by the optical amplifier 261, passed through the optical isolator 271 and the optical coupler 141, input through the optical transmission line 132 to the optical demultiplexer-multiplexer 170. The optical demultiplexer-multiplexer 170 removes an ASE noise from the optical amplifier 261 and an optical signal with a wavelength other than the above four wavelengths ($\lambda 1$ to $\lambda 4$) In like manner, the other optical signals to be transmitted through the optical transmission lines 132 to 134 are also input to the optical demultiplexer-multiplexer 170.

In the optical signal repeating and amplifying device in FIG. 28, the noise component of the wavelength-multiplexed optical signal to be output becomes very small. Therefore, the amount of a reduction in reception sensitivity after the transmission can be significantly improved.

In the optical signal repeating and amplifying devices shown in FIGS. 26 to 28, the optical amplifiers 261 to 264 are inserted into the optical transmission lines 131 to 134, respectively, that are connected to the optical demultiplexer 120 or optical demultiplexer-multiplexer 170. Therefore, by adjusting the gain of the optical amplifiers 261 to 264, the optical signal repeating and amplifying devices can serve as an optical level adjusting device. Further, they can serve as both an optical signal repeating and amplifying device and an optical level adjusting device.

An optical signal repeating and amplifying device in the twenty-fourth preferred embodiment will be explained in FIG. 29.

In the twenty-fourth embodiment, as compared with the twenty-first embodiment, the optical demultiplexer 120 in FIG. 26 is replaced by a fiber-grating type optical demultiplexer 1501, and the optical multiplexer 140 in FIG. 26 is replaced by a fiber-grating type optical multiplexer 1502. The fiber-grating type optical demultiplexer 1501 has the same composition as shown in FIG. 13, and the fiber-grating type optical multiplexer 1502 has the same composition as shown in FIG. 14. Meanwhile, optical transmission lines 110, 120 correspond to the optical transmission lines 101, 102, respectively, in FIG. 26 and optical amplifiers 51 to 54 correspond to the optical amplifiers 261 to 264 in FIG. 26.

An optical signal supplied through the optical transmission line 110 is demultiplexed into optical signals with the four wavelengths ($\lambda 1$ to $\lambda 4$) by the fiber-grating type optical demultiplexer 1501, output separately to the optical transmission lines 131 to 134. The fiber-grating type optical demultiplexer 1501 removes an ASE noise from a previous-stage optical amplifier and an optical signal with a wavelength other than the above four wavelengths ($\lambda 1$ to $\lambda 4$). Therefore, only an optical signal with a single wavelength is transmitted through each of the optical transmission lines 131 to 134. Then, the optical signals to be transmitted through the optical transmission lines 131 to 134 are amplified by the optical amplifiers 51 to 54, then multiplexed into a wavelength-multiplexed optical signal by the fiber-grating type optical multiplexer 1502. The fiber-grating type optical multiplexer 1502 removes an ASE noise from the optical amplifiers 51 to 54 and an optical signal with a wavelength other than the above four wavelengths ($\lambda 1$ to $\lambda 4$).

In the optical signal repeating and amplifying device in FIG. 29, the noise component of the wavelength-multiplexed optical signal to be output becomes very small. Therefore, the amount of a reduction in reception sensitivity after the transmission can be significantly improved. Due to this, the repeating distance can be elongated, thereby reducing the cost of optical transmission. Also, the optical signal is, as it is, repeated without converting into an electrical signal. Therefore, the repeating installation can be simplified and the cost can be reduced thus much.

Further, the optical transmission property (optical filter function) with a narrow band width can be obtained by using the fiber-grating type optical demultiplexer and multiplexer. Therefore, a high-density wavelength-multiplexed optical signal can be demultiplexed or multiplexed. Also, due to the applicability to high-density wavelength-multiplexed optical signal, the cost of optical transmission can be greatly reduced and the temperature control can be easily conducted.

An optical signal repeating and amplifying device in the twenty-fifth preferred embodiment will be explained in FIG. 30.

In the twenty-fifth embodiment, as compared with the twenty-second embodiment, the optical demultiplexer-multiplexer 170 in FIG. 27 is replaced by a fiber-grating type optical demultiplexer-multiplexer 1503. The fiber-grating type optical demultiplexer-multiplexer 1503 has a composition that the fiber-grating type optical demultiplexer in FIG. 13 and the fiber-grating type optical multiplexer in FIG. 14 are combined. Meanwhile, optical transmission lines 110, 120 and 121 correspond to the optical transmission lines 101, 102 and 103 respectively, in FIG. 27, an optical circulator 60 to the optical circulator 160 in FIG. 27, and optical amplifiers 51 to 54 to the optical amplifiers 261 to 264 in FIG. 27.

The fiber-grating type optical demultiplexer-multiplexer 1503 demultiplexes a wavelength-multiplexed optical signal supplied through the optical transmission line 110 into optical signals with the four wavelengths ($\lambda 1$ to $\lambda 4$), outputting separately to the optical transmission lines 131 to 134. The fiber-grating type optical demultiplexer-multiplexer 1503 removes an ASE noise from a previous-stage optical amplifier and an optical signal with a wavelength other than the above four wavelengths ($\lambda 1$ to $\lambda 4$) Therefore, only an optical signal with a single wavelength is transmitted through each of the optical transmission lines 131 to 134. Then, the optical signals to be transmitted through the optical transmission lines 131 to 134 are amplified by the optical amplifiers 51 to 54, reflected by the optical reflecting mirrors 151 to 154, again amplified by the optical amplifiers 51 to 54, input through the optical transmission lines 131 to 134 to the fiber-grating type optical demultiplexer-multiplexer 1503. The fiber-grating type optical demultiplexer-multiplexer 1503 multiplexes the optical signals from the optical transmission lines 131 to 134 into a wavelength-multiplexed optical signal. The fiber-grating type optical demultiplexer-multiplexer 1503 removes an ASE noise from the optical amplifiers 51 to 54 and an optical signal with a wavelength other than the above four wavelengths ($\lambda 1$ to $\lambda 4$).

In the optical signal repeating and amplifying device in FIG. 30, the noise component of the wavelength-multiplexed optical signal to be output becomes very small. Therefore, the amount of a reduction in reception sensitivity after the transmission can be significantly improved. Further, the optical transmission property (optical filter function) with a narrow band width can be obtained by using the fiber-grating type optical demultiplexer-multiplexer 1503 Therefore, a high-density wavelength-multiplexed optical signal can be demultiplexed or multiplexed. Also, due to the applicability to high-density wavelength-multiplexed optical signal, the cost of optical transmission can be greatly reduced and the temperature control can be easily conducted. Furthermore, the device composition can be simplified by using the optical reflecting mirrors 151 to 154 and can be fabricated inexpensively.

An optical signal repeating and amplifying device in the twenty-sixth preferred embodiment will be explained in FIG. 31.

In the twenty-sixth embodiment, as compared with the twenty-third embodiment, the optical demultiplexer-multiplexer 170 in FIG. 28 is replaced by the fiber-grating type optical demultiplexer-multiplexer 1503 and a controller 500 is provided to control the gain of the optical amplifiers 51 to 54. Meanwhile, optical transmission lines 110, 120 and 138 correspond to the optical transmission lines 101, 102 and 145 respectively, in FIG. 28, optical isolators 71 to 74 to the optical isolators 271 to 274 in FIG. 28, and the optical amplifiers 51 to 54 to the optical amplifiers 261 to 264 in FIG. 28.

The fiber-grating type optical demultiplexer-multiplexer 1503 removes an ASE noise from a previous-stage optical amplifier and an optical signal with a wavelength other than the above four wavelengths ($\lambda 1$ to $\lambda 4$) when it demultiplexes a wavelength-multiplexed optical signal supplied through the optical transmission line 110 into optical signals. Then, for example, the optical signal passing through the optical transmission line 131 is again input through the optical coupler(optical divider in the narrow sense) 144, optical amplifier 51, optical isolator 71, optical coupler(optical divider in the narrow sense) 141 and optical transmission line 132 to the fiber-grating type optical demultiplexer-multiplexer 1503. The fiber-grating type optical demultiplexer-multiplexer 1503 removes an ASE noise from the optical amplifiers 51 to 54 and an optical signal with a wavelength other than the above four wavelengths ($\lambda 1$ to $\lambda 4$). In like manner, the other optical signals passing through the optical transmission lines 132 to 134 are also re-input to the fiber-grating type optical demultiplexer-multiplexer 1503. Then, the fiber-grating type optical demultiplexer-multiplexer 1503 multiplexes the optical signals from the optical transmission lines 131 to 134 into a wavelength-multiplexed optical signal, outputting it to the optical transmission line 120.

In the optical signal repeating and amplifying device in FIG. 31, the noise component of the wavelength-multiplexed optical signal to be output becomes very small. Therefore, the amount of a reduction in reception sensitivity after the transmission can be significantly improved. Further, by using the controller 500, the optical level of the respective wavelength lights in the wavelength-multiplexed optical signal to be output can be adjusted into an arbitrary level.

An optical level adjusting device in the fourth preferred embodiment will be explained in FIG. 32.

In the this embodiment, optical signals with four different wavelengths (for example, $\lambda 1=1548$ nm, $\lambda 2=1550$ nm, $\lambda 3=1552$ nm and $\lambda 4=1554$ nm, hereinafter these wavelengths are also used commonly in the other embodiments) are wavelength-multiplexed and transmitted through an optical transmission line 110.

The optical transmission line 110 is connected to the optical demultiplexer 210. The optical demultiplexer 210, which is typically an array waveguide diffraction grating type optical demultiplexer, demultiplexes the multiplexed optical signal into optical signals, each of which having either of the different wavelengths ($\lambda 1$ to $\lambda 4$) as a center signal-pass band. Further, the optical transmission lines 131, 132, 133 and 134 are connected to the four output ports of the optical demultiplexer 210, the optical amplifiers 51 to 54 are inserted into the optical transmission lines 131 to 134, and the ends of the optical transmission lines 131 to 134 are connected to the optical multiplexer 310 for multiplexing optical signals to be transmitted through the optical transmission lines 131 to 134. The optical transmission line 120 is connected to the output port of the optical multiplexer 310. Further, the controller 500 is provided to control the gain of the optical amplifiers 51 to 54.

In operation, an optical signal transmitted through the optical transmission line 110 is demultiplexed into four optical signals with the above wavelengths ($\lambda 1$ to $\lambda 4$) by the optical demultiplexer 210. The optical demultiplexer 210 removes an ASE noise from the optical amplifier(not shown) of a previous-stage optical signal repeating and amplifying device or optical level adjusting device, and it further removes an optical signal with a wavelength other than the above four wavelengths (λ1 to λ4). Namely, the optical demultiplexer 210 functions as a band-pass optical filter as well as a demultiplexer to the respective wavelengths. In like manner, this function is effective for the other wavelength lights (λ2 to λ4) on the optical transmission lines 132 to 134. Then, the optical signals demultiplexed are amplified by the optical amplifiers 51 to 54, multiplexed into a wavelength-multiplexed optical signal by the optical multiplexer 310, then output to the optical transmission line 120. The optical multiplexer removes an ASE noise from the optical amplifiers 51 to 54 and an optical signal with a wavelength other than the above four wavelengths (λ1 to λ4).

The optical level of the respective wavelength lights in the wavelength-multiplexed optical signal to be output can be adjusted into an arbitrary level by controlling separately the gain of the optical amplifiers 51 to 54 by using the controller 500. The controller 500 takes out part of the optical signal to be output from each of the optical amplifiers 51 to 54, monitoring the optical intensity, feedbacking the monitor result to the optical amplifiers 51 to 54, thereby controlling the gain of the optical amplifiers 51 to 54.

In the optical level adjusting device in FIG. 32, the optical level of the respective wavelength lights in the wavelength-multiplexed optical signal can be adjusted into an arbitrary level by controlling separately the gain of the optical amplifiers 51 to 54.

An optical level adjusting device in the fifth preferred embodiment will be explained in FIG. 33.

In the this embodiment, the optical transmission line 110 is connected to the input port of the optical circulator 60, which further having an input-output port connected to the optical transmission line 121 and an output port connected to the optical transmission line 120. The optical transmission line 121 is connected to an optical demultiplexer-multiplexer 410, which is typically an array waveguide diffraction grating type optical demultiplexer, with four output ports to output the demultiplexed optical signals. The optical transmission lines 131 to 134 are connected to the output ports of the optical demultiplexer-multiplexer 410. The optical amplifiers 51 to 54 available for the bi-directional amplification are inserted into the optical transmission lines 131 to 134. Further, the optical reflecting mirrors 151 to 154 are connected to the ends of the optical transmission lines 131 to 134. The controller 500 for adjusting the reflectivity is connected to the respective optical reflecting mirrors 151 to 154.

In operation, an optical signal transmitted through the optical transmission line 110 is input through the optical circulator 60 to the optical demultiplexer-multiplexer 410, demultiplexed into four optical signals with the above wavelengths (λ1 to λ4) by the optical demultiplexer-multiplexer 410. The optical signals on the optical transmission lines 131 to 134 are amplified by the optical amplifiers 51 to 54, reflected by the optical reflecting mirrors 151 to 154, again amplified by the optical amplifiers 51 to 54, input to the optical demultiplexer-multiplexer 410. The optical demultiplexer-multiplexer 410 functions as a band-pass optical filter in both demultiplexing and multiplexing. Thereby, an ASE noise from the optical amplifiers 51 to 54 and an optical signal with a wavelength other than the above four wavelengths (λ1 to λ4) are removed.

For example, the optical signal with 1549nm wavelength to be output to the optical transmission line 131 is amplified by the optical amplifier 51, reflected by the optical reflecting mirror 151, again amplified by the optical amplifier 51, input to the optical demultiplexer-multiplexer 410. The optical demultiplexer-multiplexer 410 removes an ASE noise from the optical amplifier 51 and an optical signal with a wavelength other than the above four wavelengths (λ1 to λ4). In like manner, the optical signals are input to the optical demultiplexer-multiplexer 410. Thus, the optical signals output from the optical amplifiers 51 to 54 are multiplexed into a wavelength-multiplexed optical signal by the optical demultiplexer-multiplexer 410. output to the optical transmission line 120.

The controller 500, which controls separately the reflectivity of the optical reflecting mirrors 151 to 154, can function as a kind of attenuator, thereby adjusting the optical intensity for each wavelength into an arbitrary value. In the controlling, the controller 500 takes out part of the optical signal to be output from each of the optical amplifiers 51 to 54, monitoring the optical intensity, feedbacking the monitor result to the optical amplifiers 51 to 54, thereby controlling the gain of the optical amplifiers 51 to 54.

In the optical level adjusting device in FIG. 33, the optical level of the respective wavelength lights in the wavelength-multiplexed optical signal can be adjusted into an arbitrary level by controlling separately the reflectivity of the optical amplifiers 51 to 54.

An optical level adjusting device in the sixth preferred embodiment will be explained in FIG. 34.

In the this embodiment, the optical demultiplexer-multiplexer 410, which is typically an array waveguide diffraction grating type optical demultiplexer, is connected with the optical transmission line 110 for inputting and the optical transmission line 120 for outputting. The optical transmission lines 131 to 134 are connected to the four output ports of the optical demultiplexer-multiplexer 410. The optical couplers 144, 141, 142 and 143 are connected to the ends of the optical transmission lines 131 to 134, respectively. Further, the optical amplifier 51 and the optical isolator 71 that are in series connected are inserted between the optical couplers 141 and 144, the optical amplifier 52 and the optical isolator 72 that are in series connected are inserted between the optical couplers 141 and 142, the optical amplifier 53 and the optical isolator 73 that are in series connected are inserted between the optical couplers 142 and 143, and the optical amplifier 54 and the optical isolator 74 that are in series connected are inserted between the optical couplers 143 and 144.

An optical signal supplied through the optical transmission line 101 is demultiplexed into optical signals with four wavelengths (λ1 to λ4) by the optical demultiplexer-multiplexer 170, output separately to the optical transmission lines 131 to 134. Then, for example, the optical signal with 1548 nm wavelength to be output to the optical transmission line 131 is passed through the optical coupler 144, amplified by the optical amplifier 261, passed through the optical isolator 271 and the optical coupler 141, input through the optical transmission line 132 to the optical demultiplexer-multiplexer 170. The optical demultiplexer-multiplexer 170 removes an ASE noise from the optical amplifier 261 and an optical signal with a wavelength other than the above four wavelengths (λ1 to λ4). In like manner, the other optical signals to be transmitted through the optical transmission lines 132 to 134 are also input to the optical demultiplexer-multiplexer 170. The controller 500 for adjusting the gain is connected to the respective optical amplifiers 51 to 54.

In operation, an optical signal supplied through the optical transmission line 101 is demultiplexed into optical signals with four wavelengths (λ1 to λ4) by the optical demultiplexer-multiplexer 410, output separately to the optical transmission lines 131 to 134. Then, for example, the optical signal with 1548 nm wavelength to be output to the optical transmission line 131 is passed through the optical coupler 144, amplified by the optical amplifier 51, passed through the optical isolator 71 and the optical coupler 141, input through the optical transmission line 132 to the optical demultiplexer-multiplexer 410. In like manner, the other optical signals to be transmitted through the optical transmission lines 132 to 134 are amplified by the optical amplifiers 52 to 54, passed through the optical isolators 72 to 74, input through the optical transmission lines 133, 134 and 131 to the optical demultiplexer-multiplexer 410. Then, the optical signals from the optical transmission lines 131 to 134 are multiplexed into a wavelength-multiplexed optical signal by the optical demultiplexer-multiplexer 410, output to the optical transmission line 120. The optical demultiplexer-multiplexer 410 with the optical filter function removes an ASE noise from the optical amplifiers 51 to 54 and an optical signal with a wavelength other than the above four wavelengths ($\lambda 1$ to $\lambda 4$) in the demultiplexing and multiplexing.

When the optical signals pass through the optical couplers 141 to 144, the optical intensity of the respective optical signals is controlled by the controller 500. In the controlling, the controller 500 takes out part of the optical signal to be output from each of the optical amplifiers 51 to 54, monitoring the optical intensity, feedbacking the monitor result to the optical amplifiers 51 to 54, thereby controlling the gain of the optical amplifiers 51 to 54.

In the optical level adjusting device in FIG. 34, the optical level of the respective wavelength lights in the wavelength-multiplexed optical signal can be adjusted into an arbitrary level by controlling separately the gain of the optical amplifiers 51 to 54.

An optical level adjusting device in the seventh preferred embodiment will be explained in FIG. 35, wherein like parts are indicated by like reference numerals as used in FIG. 33.

In the this embodiment, as compared with the fifth embodiment, the controller 500 is connect to the optical amplifiers 51 to 54 in place of the optical reflecting mirrors 151 to 154. The other components and their operations are the same as shown in FIG. 33.

In this case, the controller 500 controls separately the gain of the optical amplifiers 51 to 54. In the controlling, the controller 50D takes out part of the optical signal to be output from each of the optical amplifiers 51 to 54, monitoring the optical intensity, feedbacking the monitor result to the optical amplifiers 51 to 54, thereby controlling the gain of the optical amplifiers 51 to 54.

In the optical level adjusting device in FIG. 35, the optical level of the respective wavelength lights in the wavelength-multiplexed optical signal can be adjusted into an arbitrary level by controlling separately the gain of the optical amplifiers 51 to 54.

An optical level adjusting device in the eighth preferred embodiment will be explained in FIG. 36, wherein like parts are indicated by like reference numerals as used in FIG. 32.

In the this embodiment, as compared with the fourth embodiment, the optical demultiplexer 120 in FIG. 32 is replaced by the fiber-grating type optical demultiplexer 1501, and the optical multiplexer 140 in FIG. 32 is replaced by the fiber-grating type optical multiplexer 1502. The other components and their operations are the same as shown in FIG. 32.

By using the fiber-grating type optical demultiplexer 1501 and fiber-grating type optical multiplexer 1502, a wavelength desired to pass can be arbitrarily set. thereby enhancing the degree of freedom for designing. In the optical level adjusting device in FIG. 36, the optical level of the respective wavelength lights in the wavelength-multiplexed optical signal can be adjusted into an arbitrary level by controlling separately the gain of the optical amplifiers 51 to 54 by using the controller 500.

An optical level adjusting device in the ninth preferred embodiment will be explained in FIG. 37, wherein like parts are indicated by like reference numerals as used in FIG. 33.

In the this embodiment, as compared with the fifth embodiment, the optical demultiplexer-multiplexer 410 in FIG. 33 is replaced by the fiber-grating type optical demultiplexer-multiplexer 1503. The other components and their operations are the same as shown in FIG. 33.

By using the fiber-grating type optical demultiplexer-multiplexer 1503, a wavelength desired to pass or to reflect be arbitrarily set, thereby enhancing the degree of freedom for designing.

In the optical level adjusting device in FIG. 37, the optical level of the respective wavelength lights in the wavelength-multiplexed optical signal can be adjusted into an arbitrary level by controlling separately the reflectivity of the optical reflecting mirrors 151 to 154 by using the controller 500.

An optical level adjusting device in the tenth preferred embodiment will be explained in FIG. 38, wherein like parts are indicated by like reference numerals as used in FIG. 34.

In the this embodiment, as compared with the sixth embodiment, the optical demultiplexer-multiplexer 410 in FIG. 34 is replaced by the fiber-grating type optical demultiplexer-multiplexer 1503. The other components and their operations are the same as shown in FIG. 34.

By using the fiber-grating type optical demultiplexer-multiplexer 1503, a wavelength desired to pass or to reflect be arbitrarily set, thereby enhancing the degree of freedom for designing.

In the optical level adjusting device in FIG. 38, the optical level of the respective wavelength lights in the wavelength-multiplexed optical signal can be adjusted into an arbitrary level by controlling separately the gain of the optical amplifiers 51 to 54 by using the controller 500.

In the first to twenty-third embodiments, the number of wavelength-multiplexed optical signals is four. However, the number of wavelength-multiplexed optical signals available in this invention is not limited to four and can be set to be an arbitrary number, e.g., eight, sixteen, thirty-two, sixty-four. Also, the wavelength band available in this invention is not limited to the 1550 nm band and can be set to be another wavelength band, e.g., 1300 nm band.

Also, an array waveguide diffraction grating is taken as an example for the optical demultiplexer, optical multiplexer and optical demultiplexer-multiplexer. Alternatively, a wavelength router with a grating structure, a wavelength MUX coupler or a combination of an optical divider and an interference film filter that has a like function can be used for them.

Also, an array waveguide diffraction grating that is typically used as the optical demultiplexer, optical multiplexer and optical demultiplexer-multiplexer has different insertion losses depending on wavelengths. In this regard, an optical attenuator can be optionally inserted into the optical transmission line to equalize the optical level.

In some of the above embodiments, the band-pass optical filters 201 to 204 to function as an optical filter are inserted into the optical transmission lines 131 to 134. Alternatively, the optical transmission lines 131 to 134 themselves may have a combination or optical parts with a filter function.

Further, the gain of the respective optical amplifiers or the reflectivity of the respective optical reflecting mirrors in the second embodiment can be separately controlled to equalize the optical level to each wavelength. The conventional devices have the problem that, due to the limitation on output power of optical amplifier, the optical power per one wave is limited thereby shortening the transmission distance. However, according to this control method, the limitation on optical power per one wave can be substantially released.

In the first to ninth embodiments, an array waveguide diffraction grating that is typically used as the optical demultiplexer, optical multiplexer and optical demultiplexer-multiplexer has different insertion losses depending on wavelengths. In this regard, an optical attenuator can be optionally inserted into the optical transmission line to equalize the optical level.

In the first embodiment, either of the optical demultiplexer and optical multiplexer can be replaced by an optical coupler (optical divider or coupler in the narrow sense), thereby obtaining a like effect.

In the thirteenth to fifteenth embodiments, an optical level adjusting device can be provided by removing the optical amplifier 110 and placing optical attenuators on the optical transmission lines.

Also, in the above embodiments, the ratio of optical dividing is set to be 1:1. However, the ratio of optical dividing in this invention is not limited to this and can be set to be arbitrary values, e.g., 1:2.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical signal repeating and amplifying device, comprising:

a first optical demultiplexer-multiplexer which demultiplexes a wavelength-multiplexed optical signal into a plurality of wavelength lights wherein said first optical demultiplexer-multiplexer includes an optical amplifier to amplify said wavelength-multiplexed optical signal on the input side, or a plurality of optical amplifiers to amplify separately said demultiplexed plurality of wavelength lights on the output side, said optical amplifier on the input side or said plurality of optical amplifiers on the output side is one of (a) a neodymium-doped optical fiber amplifier and (b) a praseodymium-doped optical fiber amplifier;

a plurality of optical transmission lines through which said plurality of wavelength lights from said first optical demultiplexer-multiplexer are separately transmitted; and a second optical demultiplexer-multiplexer which multiplexes the optical signals transmitted through said plurality of optical transmission lines into a wavelength-multiplexed optical signal and outputs it.

2. An optical signal repeating and amplifying device, according to claim 1, wherein:

said first optical demultiplexer-multiplexer is an optical demultiplexer and said second optical demultiplexer-multiplexer is an optical multiplexer.

3. An optical signal repeating and amplifying device, according to claim 1, wherein:

said first and second optical demultiplexer-multiplexers are an array waveguide diffraction grating type or fiber-grating type optical demultiplexer, optical multiplexer, or optical demultiplexer-multiplexer.

4. An optical level adjusting device, comprising;

an optical demultiplexer which demultiplexes a wavelength-multiplexed optical signal into a plurality of wavelength lights, said optical demultiplexer comprising one of a (a)array waveguide diffraction grating type, and (b)fiber-grating type;

a plurality of optical attenuators which attenuate separately said demultiplexed plurality of wavelength lights to be output from said optical demultiplexer; and an optical multiplexer which multiplexes said attenuated wavelength lights to be output from said plurality of optical attenuators into a wavelength-multiplexed optical signal and output it, said optical multiplexer comprising one of a (a)array waveguide diffraction grating type, and (b)fiber-grating type.

5. An optical level adjusting device, according to claim 4, wherein:

said optical attenuators are an optical variable attenuator or an optical fixed attenuator.

6. An optical level adjusting device, according to claim 4, wherein:

said optical attenuators are separately disposed on a plurality of optical transmission lines which connect between said optical demultiplexer and said optical multiplexer to transmit separately said demultiplexed plurality of wavelength lights.

7. An optical level adjusting device, according to claim 4, wherein:

said optical attenuators are replaced by optical amplifiers or include optical amplifiers to be in series connected thereto.

8. An optical level adjusting device, comprising:

a first optical demultiplexer-multiplexer which demultiplexes a wavelength-multiplexed optical signal to be input thereto into a plurality of different wavelength lights;

a plurality of optical amplifiers which amplify separately said demultiplexed plurality of different wavelength lights;

a second optical demultiplexer-multiplexer which multiplexes said amplified wavelength lights to be output from said plurality of optical amplifiers into a wavelength-multiplexed optical signal;

said first and second optical demultiplexer-multiplexers are one of a (a) array waveguide diffraction grating type, and (b) fiber-grating type, and means for controlling separately the gain of said plurality of optical amplifiers.

9. An optical level adjusting device, according to claim 8, wherein:

said plurality of optical amplifiers are inserted into optical transmission lines to connect between said first and second optical demultiplexer-multiplexers.

10. An optical level adjusting device, according to claim 8, wherein:

said plurality of optical amplifiers are a semiconductor optical amplifier or an impurity-doped optical fiber amplifier.

11. An optical level adjusting device, according to claim 8, wherein:

said first optical demultiplexer-multiplexer is an optical demultiplexer, and said second optical demultiplexer-multiplexer is an optical multiplexer.

12. An optical level adjusting device, according to claim 8, wherein:

said first and second optical demultiplexer-multiplexers are of array waveguide diffraction grating type.

13. An optical level adjusting device, according to claim 8, wherein:

said first and second optical demultiplexer-multiplexers are of fiber-grating type.

* * * * *